United States Patent
Blumsom et al.

(10) Patent No.: US 11,066,511 B2
(45) Date of Patent: *Jul. 20, 2021

(54) OLIGOMERIC POLYOL COMPOSITIONS

(71) Applicant: Presidium USA, Inc, Dover, DE (US)

(72) Inventors: James Henry Blumsom, London (CA); Andrew John Tennant, Burlington (CA); James A. Cella, Clifton Park, NY (US); David Goldwasser, Hillsboro, OR (US); Daniel J. Brunelle, Burnt Hills, NY (US); Stephen Burks, Woodstock, GA (US); Richard Heggs, Johnstown, OH (US)

(73) Assignee: Presidium USA, Inc., Dover, DE (US)

( * ) Notice: Subject to any disclaimer, the term of this patent is extended or adjusted under 35 U.S.C. 154(b) by 235 days.

This patent is subject to a terminal disclaimer.

(21) Appl. No.: 16/105,089

(22) Filed: Aug. 20, 2018

(65) Prior Publication Data

US 2019/0040184 A1 Feb. 7, 2019

Related U.S. Application Data

(63) Continuation of application No. 15/589,182, filed on May 8, 2017, now Pat. No. 10,053,533, which is a continuation of application No. PCT/US2017/032614, filed on May 15, 2017.

(60) Provisional application No. 62/485,000, filed on Apr. 13, 2017.

(51) Int. Cl.
| | |
|---|---|
| *C08G 59/62* | (2006.01) |
| *C08G 18/40* | (2006.01) |
| *C08G 18/48* | (2006.01) |
| *C08G 18/46* | (2006.01) |
| *C08G 18/50* | (2006.01) |
| *C08G 18/44* | (2006.01) |
| *C08G 18/42* | (2006.01) |
| *C08G 18/76* | (2006.01) |
| *C08G 64/42* | (2006.01) |
| *C08G 18/32* | (2006.01) |
| *C08G 18/02* | (2006.01) |
| *C08L 75/04* | (2006.01) |

(52) U.S. Cl.
CPC ............ *C08G 59/62* (2013.01); *C08G 18/02* (2013.01); *C08G 18/3206* (2013.01); *C08G 18/3215* (2013.01); *C08G 18/3284* (2013.01); *C08G 18/40* (2013.01); *C08G 18/4222* (2013.01); *C08G 18/4244* (2013.01); *C08G 18/44* (2013.01); *C08G 18/46* (2013.01); *C08G 18/4615* (2013.01); *C08G 18/48* (2013.01); *C08G 18/4829* (2013.01); *C08G 18/5021* (2013.01); *C08G 18/7664* (2013.01); *C08G 64/42* (2013.01); *C08L 75/04* (2013.01); *C08J 2375/04* (2013.01)

(58) Field of Classification Search
CPC .... C08G 59/62; C08G 18/02; C08G 18/3284; C08G 18/3215; C08G 18/3206; C08G 64/42; C08G 18/7664; C08G 18/4615; C08G 18/4244; C08G 18/4222; C08G 18/44; C08G 18/48; C08G 18/5021; C08G 18/46; C08G 18/4829; C08G 18/40; C08G 2310/00; C08L 75/04; C08J 2375/04

See application file for complete search history.

(56) References Cited

U.S. PATENT DOCUMENTS

| | | | |
|---|---|---|---|
| 4,528,364 A | 7/1985 | Prier | |
| 4,725,661 A | 2/1988 | Miyabayashi | |
| 5,066,762 A | 11/1991 | Ohbuchi et al. | |
| 5,856,372 A * | 1/1999 | Ho | C08G 18/10 521/137 |

(Continued)

FOREIGN PATENT DOCUMENTS

| | | |
|---|---|---|
| CN | 1349096 A | 5/2002 |
| CN | 101633731 A | 1/2010 |

(Continued)

OTHER PUBLICATIONS

Achaya et al., "The Component Fatty Acids and Glycerides of Castor Oil" The Journal of the American Oil Chemist's Society, vol. 41, Issue 12, pp. 783-784 (1964).

(Continued)

*Primary Examiner* — Rabon A Sergent
(74) *Attorney, Agent, or Firm* — Young Basile Hanlon & MacFarlane, P.C.

(57) ABSTRACT

There is provided an oligomeric polyol composition having (a) an oligomeric network containing residues of at least one polyhydroxylated aromatic compound and residues of at least one polyol having at least three hydroxyl groups; and (b) a plurality of peripheral groups having one or more pendant hydroxyl groups bound to the oligomeric network by a plurality of linking units. The residues of the polyol may optionally contain one or more oxygen ether groups, one or more amino ether groups, or both of one or more oxygen ether groups and one or more amino ether groups. Reaction of the oligomeric polyols with isocyanate monomers affords a new class of polyurethanes having superior heat and water resistance. The new polyurethanes exhibit lower peak exotherms, typically less than 250° F. during in-mold polymerization. Articles prepared from polyurethanes incorporating such oligomeric polyol compositions exhibit flexural strengths and moduli in excess of 10,000 psi and 400,000 psi respectively, and outstanding green strength.

27 Claims, 3 Drawing Sheets

(56) References Cited

U.S. PATENT DOCUMENTS

| | | | |
|---|---|---|---|
| 5,936,047 A | 8/1999 | De Bont et al. | |
| 5,952,450 A | 9/1999 | Ishihara et al. | |
| 5,973,099 A * | 10/1999 | Nodelman | C08G 18/088 |
| | | | 264/328.4 |
| 6,046,301 A | 4/2000 | Bolton et al. | |
| 6,534,620 B1 | 3/2003 | Hovestadt et al. | |
| 6,624,278 B2 | 9/2003 | Muller et al. | |
| 6,646,100 B2 | 11/2003 | Hofmann et al. | |
| 7,098,274 B2 | 8/2006 | Wu et al. | |
| 7,241,504 B2 | 7/2007 | Verborgt et al. | |
| 7,250,483 B2 | 7/2007 | Heuer et al. | |
| 7,521,521 B2 | 4/2009 | Bruchmann et al. | |
| 7,649,074 B2 | 1/2010 | Bruchmann et al. | |
| 7,858,732 B2 | 12/2010 | Bruchmann et al. | |
| 7,928,182 B2 | 4/2011 | Dinh et al. | |
| 7,928,183 B2 | 4/2011 | Truong Dinh et al. | |
| 7,956,285 B2 | 6/2011 | Tally et al. | |
| 7,964,202 B2 | 6/2011 | Orsoni et al. | |
| 7,990,454 B2 | 8/2011 | Notsu et al. | |
| 8,020,249 B2 | 9/2011 | Masuda et al. | |
| 8,044,170 B2 | 10/2011 | Bruchmann et al. | |
| 8,110,710 B2 | 2/2012 | Dai et al. | |
| 8,197,715 B2 | 6/2012 | Weber et al. | |
| 8,247,520 B2 | 8/2012 | Allen et al. | |
| 8,273,846 B2 | 9/2012 | Nefzger et al. | |
| 8,282,851 B2 | 10/2012 | Duwenhorst et al. | |
| 8,309,646 B2 | 11/2012 | Terrenoire et al. | |
| 8,362,146 B2 | 1/2013 | Eipper et al. | |
| 8,399,554 B2 | 3/2013 | Roller et al. | |
| 8,410,227 B2 | 4/2013 | Eipper et al. | |
| 8,428,268 B2 | 4/2013 | Konagai et al. | |
| 8,445,576 B2 | 5/2013 | Eipper et al. | |
| 8,446,125 B2 | 5/2013 | Mkhitarian | |
| 8,470,956 B2 | 6/2013 | Allen et al. | |
| 8,501,280 B2 | 8/2013 | Bruchmann et al. | |
| 8,530,567 B2 | 9/2013 | Roller et al. | |
| 8,604,155 B2 | 12/2013 | Allen et al. | |
| 8,822,622 B2 | 9/2014 | Huybrechts et al. | |
| 8,853,319 B2 | 10/2014 | Weber et al. | |
| 8,921,508 B2 | 12/2014 | Allen et al. | |
| 8,933,192 B2 | 1/2015 | Gurtler et al. | |
| 9,018,334 B2 | 4/2015 | Montgomery et al. | |
| 9,029,498 B2 | 5/2015 | Allen et al. | |
| 9,120,894 B2 | 9/2015 | Muller et al. | |
| 9,155,479 B2 | 10/2015 | Solem | |
| 9,249,259 B2 | 2/2016 | Muller et al. | |
| 9,376,531 B2 | 6/2016 | Allen et al. | |
| 9,522,976 B2 | 12/2016 | Tabor et al. | |
| 9,809,678 B2 | 11/2017 | Allen et al. | |
| 9,896,540 B2 | 2/2018 | Tabor et al. | |
| 10,053,533 B1 * | 8/2018 | Blumsom | C08G 59/62 |
| 2005/0288407 A1 | 12/2005 | Heuer et al. | |
| 2006/0116055 A1 | 6/2006 | Oyu et al. | |
| 2007/0244227 A1 | 10/2007 | Eipper et al. | |
| 2007/0257240 A1 | 11/2007 | Engelmann et al. | |
| 2007/0260015 A1 | 11/2007 | Stork et al. | |
| 2008/0015303 A1 | 1/2008 | Eibeck et al. | |
| 2008/0020194 A1 | 1/2008 | Younes et al. | |
| 2008/0045668 A1 | 2/2008 | Eibeck et al. | |
| 2008/0064827 A1 | 3/2008 | Eipper et al. | |
| 2008/0076859 A1 | 3/2008 | Eipper et al. | |
| 2008/0097033 A1 | 4/2008 | Rosenau et al. | |
| 2008/0139715 A1 | 6/2008 | Scherzer et al. | |
| 2008/0167419 A1 | 7/2008 | Eipper et al. | |
| 2008/0180895 A1 | 7/2008 | Jin et al. | |
| 2008/0194741 A1 | 8/2008 | Engelmann et al. | |
| 2008/0207812 A1 | 8/2008 | Mettlach et al. | |
| 2008/0211135 A1 | 9/2008 | Eipper et al. | |
| 2008/0214701 A1 | 9/2008 | Wilms et al. | |
| 2008/0226084 A1 | 9/2008 | Konagai et al. | |
| 2008/0309787 A1 | 12/2008 | Notsu et al. | |
| 2009/0011916 A1 | 1/2009 | Steidl | |
| 2009/0047717 A1 | 2/2009 | Gross et al. | |
| 2009/0057137 A1 | 3/2009 | Pitts et al. | |
| 2009/0064442 A1 | 3/2009 | Masuda et al. | |
| 2009/0169855 A1 | 7/2009 | Tunis | |
| 2009/0171408 A1 | 7/2009 | Solem | |
| 2009/0209701 A1 | 8/2009 | Steinmetz et al. | |
| 2009/0247658 A1 * | 10/2009 | Kobayashi | D01F 6/70 |
| | | | 521/159 |
| 2009/0275680 A1 | 11/2009 | Bruchmann et al. | |
| 2009/0281271 A1 | 11/2009 | Bruchmann et al. | |
| 2009/0315513 A1 | 12/2009 | Mkhitarian | |
| 2010/0000783 A1 | 1/2010 | Tally et al. | |
| 2010/0032611 A1 | 2/2010 | Fukuhara et al. | |
| 2010/0048935 A1 | 2/2010 | Mijolovic et al. | |
| 2010/0222524 A1 | 9/2010 | Lawrey et al. | |
| 2010/0249311 A1 | 9/2010 | Eipper et al. | |
| 2010/0280165 A1 | 11/2010 | Terrenoire et al. | |
| 2011/0196098 A1 | 8/2011 | Mettlach et al. | |
| 2011/0201745 A1 | 8/2011 | Roller et al. | |
| 2011/0274932 A1 | 11/2011 | Benten et al. | |
| 2012/0003454 A1 | 1/2012 | Younes et al. | |
| 2012/0085961 A1 | 4/2012 | Rogunova et al. | |
| 2012/0201982 A1 | 8/2012 | Stewart et al. | |
| 2014/0371363 A1 | 12/2014 | Nakamura et al. | |
| 2015/0299372 A1 | 10/2015 | Allen et al. | |
| 2015/0299374 A1 | 10/2015 | Hofmann et al. | |
| 2016/0229955 A1 | 8/2016 | Muller et al. | |
| 2016/0272756 A1 | 9/2016 | Tabor et al. | |
| 2016/0297919 A1 | 10/2016 | Klesczewski et al. | |
| 2016/0362518 A1 | 12/2016 | Muller et al. | |
| 2017/0051103 A1 | 2/2017 | Tabor et al. | |
| 2018/0134841 A1 | 5/2018 | Share et al. | |
| 2018/0155481 A1 | 6/2018 | Share et al. | |

FOREIGN PATENT DOCUMENTS

| | | |
|---|---|---|
| CN | 101775129 A | 7/2010 |
| CN | 102206333 A | 10/2011 |
| CN | 102382441 A | 3/2012 |
| CN | 102911636 A | 2/2013 |
| CN | 104004179 A | 8/2014 |
| CN | 104119486 A | 10/2014 |
| CN | 104163976 A | 11/2014 |
| CN | 104356634 A | 2/2015 |
| CN | 104610872 A | 5/2015 |
| CN | 105174822 A | 12/2015 |
| CN | 106008948 A | 10/2016 |
| CN | 108070067 A * | 5/2018 |
| CZ | 2011/0336 A3 | 1/2013 |
| EP | 2548906 A1 | 1/2013 |
| EP | 2548907 A1 | 1/2013 |
| JP | S60210674 A | 10/1985 |
| JP | H03152181 A | 6/1991 |
| JP | H08080672 A | 3/1996 |
| JP | 2002284976 A | 10/2002 |
| JP | 2002293869 A | 10/2002 |
| JP | 2003147070 A | 5/2003 |
| JP | 2003147185 A | 5/2003 |
| JP | 2003183405 A | 7/2003 |
| JP | 2003192761 A | 7/2003 |
| JP | 2003246852 A | 9/2003 |
| JP | 2004035738 A | 2/2004 |
| JP | 2006160871 A | 6/2006 |
| JP | 2010013523 A | 1/2010 |
| JP | 2017014413 A | 1/2017 |
| JP | 2018044431 A | 3/2018 |
| JP | 2018047011 A | 3/2018 |
| RU | 2297430 C2 | 4/2007 |
| WO | 2007/009897 A1 | 1/2007 |
| WO | 2011/089120 A1 | 7/2011 |
| WO | 2011/129940 A1 | 10/2011 |
| WO | 2013/011014 A1 | 1/2013 |
| WO | 2013/011015 A1 | 1/2013 |
| WO | 2014/072336 A1 | 5/2014 |
| WO | 2014/203173 A1 | 12/2014 |
| WO | 2015/078801 A1 | 6/2015 |
| WO | 2015/128277 A1 | 9/2015 |
| WO | 2015/132080 A1 | 9/2015 |
| WO | 2016/001164 A1 | 1/2016 |
| WO | 2016/025421 A1 | 2/2016 |

(56) References Cited

FOREIGN PATENT DOCUMENTS

| | | |
|---|---|---|
| WO | 2016/025423 A1 | 2/2016 |
| WO | 2016/186727 A1 | 11/2016 |

OTHER PUBLICATIONS

Appendix A Supplementary material. Available at Hyperlink "http://dx.doi.org/10.1016/j" \h http://dx.doi.org/10.1016/j .eurpolymj .2016.11.030 cited at the end of the article. Benes et al., "Medium Chain Glycerides of Coconut Oil for Microwave-Enhanced Conversion of Polycarbonate into Polyols" European Polymer Journal, vol. 86, pp. 173-187 (2017).

Benes et al., "Medium chain glycerides of coconut oil for microwave-enhanced conversion of polycarbonate into polyols" European Polymer Journal, 86, pp. 173-187, 2016.

Benes et al., "Polyurethane foams based entirely on recycled polyols derived from natural oils" Polimery, vol. 60, Issue 9, pp. 579-585 (2015).

Chao-Hsing et al., "Novel Chemical Recycling of Polycarbonate (PC) Waste Into Bis-Hydroxyalkyl Ethers of Bisphenol A for Use as PU Raw Materials," Green Chemistry, Issue 1, pp. 38-43, Jan. 2007.

Iannone et al., "Ionic liquids/ZnO nanoparticles as recyclable catalyst for polycarbonate depolymerization," Journal of Molecular Catalysis A: Chemical, 426(Part A), pp. 107-116, 2017.

International Search Report and Written Opinion from the European Patent Office for Application No. PCT/US2017/032614 dated Dec. 14, 2017 (1991.00 IWO).

Lin et al., "Identification and Quantification of the Molecular Species of Acylglycerols in Castor Oil by HPLC Using ELSD" Journal of Liquid Chromatography & Related Technologies, vol. 26, Issue 5, pp. 773-780 (2003).

Liu et al., "Fully degradable brush polymers with polycarbonate backbones and polylactide side chains," Science China: Chemistry, 58(6), pp. 999-1004, 2015.

Nikj e et al., "Chemical recycling of polycarbonate wastes into bisphenol A by using green solvent composition," Polimery, 58(4), pp. 292-294, Warsaw, Poland, 2013.

Pant, "Polycarbonate Waste Management using Gylcerol," Process Safety and Environmental Protection, 100, pp. 281-287, 2016.

Ray et al., "Polycarbonate and Poly(carbonate-ester)s Synthesized from Biocompatible Building Blocks of Glycerol and Lactic Acid," Macromolecules, 36(10), pp. 3557-3562, 2003.

First Examination Report in co-pending application IN201947045635 dated Oct. 31, 2020 (5 pages).

\* cited by examiner

OLIGOMERIC POLYOL COMPOSITIONS

CROSS-REFERENCE TO RELATED APPLICATION

This application is a continuation of U.S. Ser. No. 15/589,182 filed May 8, 2017, patented as U.S. Pat. No. 10,053,533, and of PCT/US2017/32614 filed May 15, 2017, published as PCT Publication No. WO2018/190891. This application claims priority from U.S. Provisional Application Ser. No. 62/485,000 filed Apr. 13, 2017. These applications are incorporated herein by reference in their entirety for all purposes.

BACKGROUND

This disclosure relates to oligomeric compositions useful in the preparation of polymeric compositions. In particular, this disclosure relates to oligomeric polyol compositions useful in the preparation of polyurethane compositions.

Polyurethanes are important industrial polymers used in a wide variety of applications including rigid and flexible foams, thermoplastic and thermosetting elastomers, sealants, coatings and adhesives, elastomeric fibers, and synthetic leather-like materials. Most polyurethanes used commercially are elastomers with Young's moduli less than about 50,000 psi, but some polyurethanes in unfilled form have moduli ranging from 250,000 psi to 500,000 psi or more. Examples include TPU engineering plastics (Isoplast®) and a number of commercial cast systems. Polyurethanes have several shortcomings including the need for mold release agents, long demold times (poor green strength) and intense in-mold exotherms that can cause visual imperfections in the final part. Such imperfections include color change and surface splay from outgassing. Most polyurethane elastomers are generally not used for structural applications due to their typical low modulus and strength. The flexural moduli of most polyurethane compositions are well below 300,000 psi and flexural strength values are typically below 10,000 psi. Known polyurethanes may be deficient in terms of their resistance to heat and are frequently characterized by heat distortion temperatures which are less than 100 degrees centigrade. In addition, upon exposure to conditions of high humidity at moderate temperature known polyurethanes may exhibit significant loss of material properties.

U.S. Pat. No. 8,110,710 discloses the reaction of bisphenol A polycarbonate with aliphatic diols to produce a mixture of bisphenol A hydroxy alkylene ethers and free bisphenol A. The reference does not disclose the formation of oligomeric polyols comprising an oligomeric network comprising residues of at least one polyhydroxylated aromatic compound and residues of at least one polyol having at least three hydroxyl groups.

Non-patent reference Process Safety and Environmental Protection, Volume 100, Pages 281-287, 2016 discloses the reaction of bisphenol A polycarbonate with glycerol to produce a mixture of free bisphenol A and the mono and diglycerol ethers of bisphenol A. The reference does not disclose the formation of oligomeric polyols comprising an oligomeric network comprising residues of at least one polyhydroxylated aromatic compound and residues of at least one polyol having at least three hydroxyl groups.

International Application WO 2015/132080 A1 discloses the reaction of 2-hydroxyethyl 2-oxo-1,3-dioxolane-4-carboxylate with an oligomer of the mono-glycidyl ether of bisphenol A to provide an adduct comprising two terminal residues of 2-hydroxyethyl 2-oxo-1,3-dioxolane-4-carboxylate which is subsequently reacted with a diamine to produce a linear polyurethane. The reference does not disclose the formation of oligomeric polyols comprising an oligomeric network comprising residues of at least one polyhydroxylated aromatic compound and residues of at least one polyol having at least three hydroxyl groups. Nor does the reference disclose a polyurethane prepared from such an oligomeric polyol and advantages attendant the incorporation of such oligomeric polyols into highly crosslinked polyurethanes.

Thus, there is a need for new polyurethane compositions which exhibit superior heat resistance, enhanced stability in the presence of water, improved strength, hardness, and molding characteristics relative to known polyurethane materials. There is a need for starting materials useful in preparing polyurethane based compositions which exhibit superior heat resistance, enhanced stability in the presence of water, improved strength, hardness, and molding characteristics relative to known polyurethane materials.

BRIEF DESCRIPTION

This disclosure addresses many of the shortcomings of known polyurethanes by providing novel oligomeric polyol compositions, which when reacted with isocyanate monomers or functional equivalents thereof provide a new class of polyurethanes having superior heat resistance and superior resistance to water. The polyurethane compositions disclosed herein may exhibit heat distortion temperatures in excess of 110 degrees centigrade, and essentially no loss of material properties in prolonged humidity tests at 70 degrees centigrade. The new polyurethanes exhibit lower peak exotherms, typically less than 250 degrees Fahrenheit during in-mold curing/polymerization. In addition, articles prepared from polyurethanes incorporating such oligomeric polyol compositions as reactants exhibit flexural strengths in excess of 10,000 psi and flexural moduli in excess of 400,000 psi and exhibit outstanding green strength.

Disclosed is an oligomeric polyol composition comprising: (a) an oligomeric network comprising residues of at least one polyhydroxylated aromatic compound and residues of at least one polyol having at least three hydroxyl groups; and (b) a plurality of peripheral groups comprising one or more pendant hydroxyl groups bound to the oligomeric network by a plurality of linking units; wherein the residues of the at least one polyol may comprise one or more internal functional groups containing a heteroatom. The one or more internal functional groups containing a heteroatom may comprise one or more oxygen ether groups, one or more amino ether groups, or both of one or more oxygen ether groups and one or more amino ether groups. The polyhydroxylated aromatic compound is a compound containing at least one aromatic ring and at least two hydroxyl groups each bonded directly to an aromatic ring of such compound; the pendant hydroxyl groups are disposed on the oligomeric polyol at a location where they are capable of reacting with any functional group reactive with a hydroxyl group. The functional group reactive with a hydroxyl group may be an isocyanate group. A portion of the at least one polyhydroxylated aromatic compounds may comprise at least one bisphenol. The linking units may be oxygen atoms of hydrocarbyl ether linkages, carbonate moieties, carbonyl moieties, ester moieties, or amino ether moieties Disclosed is an oligomeric polyol composition comprising: (a) an oligomeric network comprising residues of at least one bisphenol and residues of at least one polyol having at least three hydroxyl groups; and (b) a plurality of peripheral groups bound to the oligomeric network by a plurality of linking units, the peripheral groups comprising one or more pendant hydroxyl groups; wherein the residues of the at least one monomeric polyol may comprise one or more internal functional groups containing a heteroatom. The one or more internal functional groups containing a heteroatom may comprise one or more oxygen ether groups, one or more amino ether groups, or one or more oxygen ether groups and one or more amino ether groups.

Disclosed is an oligomeric polyol composition comprising: (a) an oligomeric network comprising residues of at least one polyhydroxylated aromatic compound and residues of at least one polyol having at least three hydroxyl groups and residues of at least one polyhydroxylated amine; and (b) a plurality of peripheral groups having one or more pendant hydroxyl groups bound to the oligomeric network by a plurality of linking units; wherein the residues of the at least one polyol and the at least one polyhydroxylated amine may comprise one or more internal functional groups containing a heteroatom. The one or more internal functional groups containing a heteroatom may comprise one or more oxygen ether groups, one or more amino ether groups, or both one of or more oxygen ether groups and one or more amino ether groups.

Disclosed is an oligomeric polyol composition comprising: (a) an oligomeric network comprising residues of at least one bisphenol and residues of at least one monomeric polyol having at least three hydroxyl groups and residues of at least one polyhydroxylated amine; and (b) a plurality of peripheral groups bound to the oligomeric network by a plurality of linking units, the peripheral groups comprising one or more pendant hydroxyl groups; wherein the residues of the at least one monomeric polyol may comprise one or more oxygen ether groups, one or more amino ether groups, or both one or more oxygen ether groups and one or more amino ether groups; and wherein the residues of at least one polyhydroxylated amine may comprise one or more oxygen ether groups.

Disclosed is a method of making an oligomeric polyol composition comprising: contacting one or more compositions containing one or more polyhydroxylated aromatic moieties with one or more polyol moieties in the presence of at least one activating agent and an effective amount of at least one of a catalyst, a promoter or a mixture thereof, at a temperature sufficient to cause formation of an oligomeric network comprising residues of at least one polyhydroxylated aromatic compound and residues of at least one polyol to provide a product oligomeric polyol composition.

Disclosed is a method of making an oligomeric polyol composition comprising: contacting one or more bisphenol moieties with one or more polyol moieties in the presence of at least one activating agent and an effective amount of at least one of a catalyst, a promoter or a mixture thereof, at a temperature sufficient to cause formation of an oligomeric network comprising residues of at least one bisphenol and residues of at least one polyol to provide a product oligomeric polyol composition.

Disclosed is an oligomeric polyol composition prepared by a method comprising: contacting one or more polyhydroxylated aromatic moieties with one or more polyol moieties in the presence of at least one activating agent and an effective amount of at least one of a catalyst, a promoter or a mixture thereof, at a temperature sufficient to cause formation of an oligomeric network comprising residues of at least one polyhydroxylated aromatic and residues of at least one polyol to provide a product oligomeric polyol composition.

Disclosed is an oligomeric polyol composition prepared by a method comprising: contacting one or more bisphenol moieties with one or more polyol moieties in the presence of at least one activating agent and an effective amount of at least one of a catalyst, a promoter or a mixture thereof, at a temperature sufficient to cause formation of an oligomeric network comprising residues of at least one bisphenol and residues of at least one monomeric polyol to provide a product oligomeric polyol composition.

Disclosed is a polyurethane composition prepared from one or more polyisocyanates and at least one oligomeric polyol composition comprising an oligomeric network comprising residues of at least one polyhydroxylated aromatic compound and residues of at least one polyol having at least three hydroxyl groups having a plurality of peripheral groups bound to the oligomeric network by a plurality of linking units, the peripheral groups comprising one or more pendant hydroxyl groups; wherein urethane units are formed from the isocyanate moieties and the pendant hydroxyl groups.

Disclosed is a polyurethane composition prepared from one or more polyisocyanates and at least one oligomeric polyol composition comprising an oligomeric network comprising residues of at least one bisphenol compound and residues of at least one polyol having at least three hydroxyl groups having a plurality of peripheral groups bound to the oligomeric network by a plurality of linking units, the peripheral groups comprising one or more pendant hydroxyl groups; wherein urethane units are formed from the isocyanate moieties and the pendant hydroxyl groups.

Disclosed is an article comprising one or more polyurethane compositions disclosed herein. Disclosed is a molded article comprising one or more polyurethane compositions disclosed herein. Disclosed is method of making a polyurethane composition comprising contacting one or more polyisocyanates with one or more oligomeric polyol compositions comprising (a) an oligomeric network comprising residues of at least one polyhydroxylated aromatic compound and residues of at least one polyol having at least three hydroxyl groups and (b) a plurality of peripheral groups bound to the oligomeric network by a plurality of linking units, the peripheral groups comprising one or more pendant hydroxyl groups, optionally in the presence of a catalyst, at a temperature sufficient to cause at least a portion of the pendant hydroxyl groups of the peripheral groups to react with one or more isocyanate groups or latent isocyanate groups of the polyisocyanate moieties to form a polyurethane product.

Disclosed is a method of making a polyurethane composition comprising contacting one or more polyisocyanate moieties with one or more oligomeric polyol compositions comprising (a) an oligomeric network comprising residues of at least one bisphenol and residues of at least one monomeric polyol having at least three hydroxyl groups and (b) a plurality of peripheral groups bound to the oligomeric network by a plurality of linking units, the peripheral groups comprising one or more pendant hydroxyl groups, optionally in the presence of a catalyst, at a temperature sufficient to cause at least a portion of the pendant hydroxyl groups of the peripheral groups to react with one or more isocyanate groups or latent isocyanate groups of the polyisocyanate moieties to form a polyurethane product.

There is disclosed a method of making a molded article comprising: (a) mixing a first reactant comprising one or more polyisocyanates or latent polyisocyanates with a second reactant comprising an oligomeric polyol composition as disclosed herein; (b) transferring the reactive mixture into a mold; and (c) curing the reactive mixture within the mold to afford a molded article.

The polyurethane materials provided by this disclosure are well suited for use in the manufacture of structural and semi-structural vehicle parts such as automotive and heavy truck body panels, floor panels, brackets, bumper covers, footsteps and housings, and interior parts such as door panels, arm rests, center console bodies and covers, cup holders and similar parts. Other applications include the use of the polyurethanes in the manufacture of structural and semi-structural agricultural equipment components such as tractor body parts, brackets, grilles, fan shrouds and the like, and building and construction and industrial infrastructural pieces such as decks and railings, building trim, window lineals, manhole covers and electrical boxes. Further applications include manufacture of aquatic sports equipment such as kayaks, canoes, personal watercraft such as jet skis, paddle boards, surf boards, and light weight fishing craft.

DETAILED DESCRIPTION

Figure 1:
FIG. 1 is a photograph of a molded polyurethane article comprising a novel oligomeric polyol composition PEP450/9181/PC105.

The explanations and illustrations presented herein are intended to acquaint others skilled in the art with the disclosure, its principles, and its practical application. The specific embodiments of the present disclosure as set forth are not intended as being exhaustive or limiting of the disclosure. The scope of the disclosure should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

One or more as used herein means that at least one, or more than one, of the recited components may be used as disclosed. Nominal as used with respect to functionality means the theoretical functionality. This can be calculated from the stoichiometry of the ingredients used. The actual functionality may be different due to imperfections in raw materials, incomplete conversion of the reactants and formation of by-products. Durability in this context means that the composition once cured remains sufficiently strong to perform its designed function Residual content of a component refers to the amount of the component present in free form or reacted with another material, such as an adduct, oligomer or a cured product. The residual content of a component can be calculated from the ingredients utilized to prepare the component or composition. It may be determined utilizing known analytical techniques. Heteroatom means nitrogen, oxygen, sulfur, silicon, selenium and phosphorus, heteroatoms may include nitrogen and oxygen. Hydrocarbyl as used herein refers to a group containing one or more carbon atom backbones and hydrogen atoms, which may optionally contain one or more heteroatoms. As used herein, the term "hydrocarbyl" refers an organic radical which may be any of an aromatic radical, a cycloaliphatic radical, or an aliphatic radical as those terms are defined herein. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. As used herein percent by weight or parts by weight refer to, or are based on, the weight of the disclosed compositions unless otherwise specified.

The term isocyanate-reactive compound as used herein includes any organic compound having nominally greater than one, or at least two, isocyanate-reactive moieties. For the purposes of this invention, an active hydrogen containing moiety refers to a moiety containing a hydrogen atom which, because of its position in the molecule, displays significant activity according to the Zerewitinoff test described by Wohler in the Journal of the American Chemical Society, Vol. 49, p. 3181 (1927). Illustrative of such isocyanate reactive moieties, such as active hydrogen moieties, are —COOH, —OH, —NH2, —NH—, —CONH2, —SH, and —CONH—. Preferable active hydrogen containing compounds include polyols, polyamines, polymercaptans and polyacids. More preferably, the isocyanate reactive compound is a polyol, and is even more preferably a polyether polyol.

As used herein, the term "aromatic radical" refers to an array of atoms having a valence of at least one comprising at least one aromatic group. The array of atoms having a valence of at least one comprising at least one aromatic group may include heteroatoms or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly, a tetrahydronaphthyl radical is an aromatic radical comprising an aromatic group (C6H3) fused to a nonaromatic component —(CH2)4-. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a C7 aromatic radical comprising a methyl group, the methyl group being a functional group which is an alkyl group. Similarly, the 2-nitrophenyl group is a C6 aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF3)2PhO—), 4-chloromethylphen-1-yl, 3-trifluorovinyl-2-thienyl, 3-trichloromethylphen-1-yl (i.e., 3-CCl3Ph-), 4-(3-bromoprop-1-yl)phen-1-yl (i.e., 4-BrCH2CH2CH2Ph-), and the like. Further examples of aromatic radicals include 4-allyloxyphen-1-oxy, 4-aminophen-1-yl (i.e., 4-H2NPh-), 3-amino-carbonylphen-1-yl (i.e., NH2COPh-), 4-benzoylphen-1-yl, dicyanomethylidenebis(4-phen-1-yloxy) (i.e., —OPhC(CN)2PhO—), 3-methylphen-1-yl, methylenebis (4-phen-1-yloxy) (i.e., —OPhCH2PhO—), 2-ethylphen-1-yl, phenylethenyl, 3-formyl-2-thienyl, 2-hexyl-5-furanyl, hexa-methylene-1,6-bis(4-phen-1-yloxy) (i.e., —OPh(CH2)6PhO—), 4-hydroxymethylphen-1-yl (i.e., 4-HOCH2Ph-), 4-mercaptomethylphen-1-yl (i.e., 4-HSCH2Ph-), 4-methythiophen-1-yl (i.e., 4-CH3SPh-), 3-methoxyphen-1-yl, 2-methoxycarbonylphen-1-yloxy (e.g., methyl salicyl), 2-nitro-methylphen-1-yl (i.e., 2-NO2CH2Ph), 3-trimethylsilylphen-1-yl, 4-t-butytdimethylsilylphen-1-yl, 4-vinylphen-1-yl, vinylidenebis(phenyl), and the like. The term "a C3-C10 aromatic radical" includes aromatic radicals containing at least three but no more than 10 carbon atoms. The aromatic radical 1-imidazolyl (C3H2N2-) represents a C3 aromatic radical. The benzyl radical (C7H7-) represents a C7 aromatic radical.

As used herein the term "cycloaliphatic radical" refers to a radical having a valence of at least one and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C6H11CH2-) is a cycloaliphatic radical which comprises a cyclohexyl ring (the array of atoms which is cyclic but which is not aromatic) and a methylene group (the noncyclic component). The cycloaliphatic radical may include heteroatoms or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C6 cycloaliphatic radical comprising a methyl group, the methyl group being a functional group which is an alkyl group. Similarly, the 2-nitrocyclobut-1-yl radical is a C4 cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethytcyclohex-1-yl, hexafluoroiso-propylidene-2,2-bis (cyclohex-4-yl) (i.e., —C6H10C(CF3)2 C6H10-), 2-chloromethylcyclohex-1-yl, 3-difluoromethylenecyclohex-1-yl, 4-trichloromethylcyclohex-1-yloxy, 4-bromodichloromethyl-cyclohex-1-ylthio, 2-bromoethytcyclopent-1-yl, 2-bromopropylcyclohex-1-yloxy (e.g., CH3CHBrCH2C6H10O—), and the like. Further examples of cycloaliphatic radicals include 4-allyloxycyclohex-1-yl, 4-aminocyclohex-1-yl (i.e., H2NC6H10-), 4-aminocarbonylcyclopent-1-yl (i.e., NH2COC5H8-), 4-acetyloxycyclohex-1-yl, 2,2-dicyanoisopropylidenebis(cyclohex-4-yloxy) (i.e., —OC6H10C(CN)2C6H10O—), 3-methylcyclohex-1-yl, methylenebis(cyclohex-4-yloxy) (i.e., —OC6H10CH2C6H10O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —O C6H10(CH2)6C6H10O—), 4-hydroxymethylcyclohex-1-yl (i.e., 4-HOCH2C6H10-), 4-mercapto-methylcyclohex-1-yl (i.e., 4-HSCH2C6H10-), 4-methylthiocyclohex-1-yl (i.e., 4-CH3SC6H10-), 4-methoxycyclohex-1-yl, 2-methoxycarbonylcyclohex-1-yloxy (2-CH3OCOC6H10O—), 4-nitro-methylcyclohex-1-yl (i.e., NO2CH2C6H10-), 3-trimethylsilylcyclohex-1-yl, 2-t-butyldimethyl-silylcyclopent-1-yl, 4-trimethoxysilylethylcyclohex-1-yl (e.g., (CH3O)3SiCH2CH2C6H10-), 4-vinylcyclohexen-1-yl, vinylidenebis(cyclohexyl), and the like. The term "a C3-C10 cycloaliphatic radical" includes cycloaliphatic radicals containing at least three but no more than 10 carbon atoms. The cycloaliphatic radical 2-tetrahydrofuranyl (C4H7O—) represents a C4 cycloaliphatic radical. The cyclohexylmethyi radical (C6H11CH2-) represents a C7 cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C6 aliphatic radical comprising a methyl group, the methyl group being a functional group which is an alkyl group. Similarly, the 4-nitrobut-1-yl group is a C4 aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloro-methyl, bromoethyl, 2-bromotrimethylene (e.g., —CH2CHBrCH2-), and the like. Further examples of aliphatic radicals include allyl, aminocarbonyl (i.e., —CONH2), carbonyl, 2,2-dicyanoisopropylidene (i.e., —CH2C(CN)2CH2-), methyl (i.e., —CH3), methylene (i.e., —CH2-), ethyl, ethylene, formyl (i.e., —CHO), hexyl, hexamethylene, hydroxymethyl (i.e., —CH2OH), mercaptomethyl (i.e., —CH2SH), methylthio (i.e., —SCH3), methylthiomethyl (i.e., —CH2SCH3), methoxy, methoxy-carbonyl (i.e., CH3OCO—), nitromethyl (i.e., —CH2NO2), thiocarbonyl, trimethylsilyl (i.e., (CH3)3Si—), t-butyldimethylsilyl, 3-trimethyoxysilylpropyl (i.e., (CH3O)3SiCH2CH2CH2-), vinyl, vinylidene, and the like. By way of further example, a C1-C10 aliphatic radical contains at least one but no more than 10 carbon atoms. A methyl group (i.e., CH3-) is an example of a C1 aliphatic radical. A decyl group (i.e., CH3(CH2)9-) is an example of a C10 aliphatic radical.

As used herein, the term hydrocarbyl ether linkage refers to an oxygen atom linking a hydrocarbyl group to another hydrocarbyl group, an aromatic radical, a cycloaliphatic radical, or an aliphatic radical. As used herein, the term aromatic ether linkage refers to an oxygen atom linking an aromatic radical to another aromatic radical, a cycloaliphatic radical, or an aliphatic radical. As used herein, the term cycloaliphatic ether linkage refers to an oxygen atom linking a cycloaliphatic radical to another cycloaliphatic radical, or an aliphatic radical. As used herein, the term aliphatic ether linkage refers to an oxygen atom linking an aliphatic radical to another aliphatic radical. As used herein, the term aromatic peripheral group refers to a peripheral group comprising at least one aromatic radical. As used herein, the term cycloaliphatic peripheral group refers to a peripheral group comprising at least one cycloaliphatic radical and not comprising an aromatic radical. As used herein, the term aliphatic peripheral group refers to a peripheral group comprising at least one aliphatic radical and not comprising an aromatic radical or a cycloaliphatic radical. As used herein, the term aliphatic polyol refers to a polyol comprising at least one aliphatic radical and not comprising a cycloaliphatic radical or an aromatic radical. As used herein, the term cycloaliphatic polyol refers to a polyol comprising at least one cycloaliphatic radical and not comprising an aromatic radical. As used herein, the term aromatic polyol refers to a polyol comprising at least one aromatic radical. As used herein the term SMC refers to Sheet Molded Compounds and associated molding methods. As used herein the term BMC refers to Bulk Molded Compounds and associated molding methods. As used herein residue means the remainder of a compound utilized to form a reaction product remaining in the reaction product wherein the residue is covalently bonded into the formed reaction product. As used herein methylene ether means a linking oxygen atom comprised within an alkylene chain. As used herein amino ether means a linking nitrogen atom comprised within an alkylene chain.

The oligomeric polyol compositions disclosed herein comprise one or more oligomeric polyols constituted by an oligomeric network linked to groups at the periphery of the oligomeric network, referred to herein as peripheral groups. Although the precise structures of the oligomeric polyols have not been entirely elucidated, it is believed that the oligomeric network portion of the oligomeric polyol is comprised of residues of one or more polyols and residues of one or more polyhydroxylated aromatic compounds, such as bisphenols. The peripheral groups are constituted by either or both of a residue of a polyol and a residue of polyhydroxylated aromatic compound, such as a bisphenol. A peripheral group is the residue of either a polyhydroxylated aromatic compound, such as a bisphenol or a polyol when either such residue is attached to the oligomeric network by one or more linking units, or a single linking unit.

The peripheral group may comprise a polyol residue directly linked to a residue of a polyhydroxylated aromatic compound, such as a bisphenol residue linked by a single linking unit to the oligomeric network. The combination of a polyol residue and the residue of the polyhydroxylated aromatic compound, such as a bisphenol, residue, is considered as a peripheral group. A peripheral group is a group containing one or more hydroxyl groups disposed in a location on the oligomeric polyol such that one or more of the hydroxyl groups are available for reaction with a compound reactive with hydroxyl groups. In this context, the groups reactive with a hydroxyl group may be isocyanate groups, isocyanurate groups, carbamate ester groups, epoxy groups, carbonate groups or the like. The groups reactive with a hydroxyl group may be isocyanate groups. The peripheral groups may be the outermost units of the oligomeric polyol. The peripheral groups may contain but a single residue of a polyol or a single residue of a polyhydroxylated aromatic compound, such as a bisphenol.

The oligomeric network comprises residues of at least one polyhydroxylated aromatic compound, such as a bisphenol, and residues of at least one polyol having at least three hydroxyl groups. This means that a free polyol to which the polyol residue relates has three or more free hydroxyl groups. Such polyols may be considered monomeric in the sense that they are not themselves polymers. The polyols may have molecular weights under 1000 grams per mole, under 500 grams per mole, or under 300 grams per mole. The polyols may have molecular weights of 100 grams per mole or greater or 130 grams per mole or greater. The polyols may be employed as mixtures of structurally related polyols having different molecular weights, and such mixtures qualify as polyols as defined herein when the molecular weights of fifty mole percent of the constituent polyols meet the defined molecular weights. A single oligomeric polyol may comprise the residues of one or more different polyols. For example, an oligomeric polyol may contain residues of two different polyols having differing chemical and physical properties. For example, the residues of a first constituent polyol may comprise one or more oxygen ether groups, one or more amino ether groups, or both one or more oxygen ether groups and one or more amino ether groups, while a second constituent monomeric polyol residue may comprise one or more oxygen ether groups but be substantially free of amino ether groups.

A variety linking unit types within the oligomeric network are possible. Any linking unit that can bind the constituent residues of the oligomeric network to one another may be used. The linking unit may be a heteroatom containing moiety capable of bonding two hydrocarbyl moieties together. Exemplary linking units may be oxygen atoms of hydrocarbyl ether linkages, carbonate groups, carbonyl groups, ester groups, thioether sulfur atoms, acetal groups, thioacetal groups, acylal groups, orthoester groups, orthocarbonate groups, silicon containing groups, and amino ether moieties. The linking unit may be an ether, amino ether or carbonate moiety. The linking unit may be a carbonate moiety. The polyhydroxylated aromatic compound residues may form two bonds to other oligomeric network residues but may form additional bonds to other network residues. For example, the residue may be that of polyhydroxylated aromatic compound having three or more hydroxyl groups, for example one or more branching agents commonly utilized in preparing polycarbonate resins for example the residues of 1,1,1-tris(4-hydroxyphenyl)ethane and 2,6-bis [(2-hydroxy-3,5-dimethyl)methyl]-4-methyiphenol (CAS. No. 35924-04-0). In such cases, the residues of the polyhydroxylated aromatic compound having three or more hydroxyl groups may be linked to more than two other residues within the oligomeric network.

The oligomeric network comprises residues of polyols linked to two or more other network residues which may be residues of a polyhydroxylated aromatic compound, residues of another polyol, or a combination of one or more residues of a polyhydroxylated aromatic compound and residues of one or more other polyols. A polyol residue within the oligomeric network may in some instances be linked to one or more other residues within the oligomeric network and also to one or more peripheral groups. The oligomeric network may comprise a plurality of hydroxyl groups pendant from one or more network constituent residues. In some instances, fifty mole percent, seventy-five mole percent, ninety-five mole percent, or ninety-nine mole percent of polyol residues within the oligomeric network comprise one or more pendant hydroxyl groups.

The oligomeric polyols comprise a plurality of peripheral groups bound to the oligomeric network by a plurality of linking units. Each peripheral group is bound to the oligomeric network by at least a single linking unit. The nature of the linking units may depend on the manner in which the oligomeric polyol is prepared. Any linking unit that can bind the peripheral group to the oligomeric network may be used. The linking unit binding the peripheral group to the oligomeric network may be a heteroatom containing moiety capable of bonding two hydrocarbyl moieties together. Exemplary linking units may be oxygen atoms of hydrocarbyl ether linkages, carbonate groups, carbonyl groups, ester groups, thioether sulfur atoms, acetal groups, thioacetal groups, acylal groups, orthoester groups, orthocarbonate groups, silicon containing groups, and amino ether moieties. The linking unit may be an ether, amino ether or carbonate moiety. The linking unit may be a carbonate moiety. Thus, the linking unit binding a peripheral group to the oligomeric network may be a single atom linking unit such as the oxygen atom of an ether group or the sulfur atom of a thioether group; or a multi-atom linking unit such as carbonate groups and ester groups. The peripheral groups comprise one or more pendant hydroxyl groups. A pendant hydroxyl group is located on the structure of the oligomeric network in a location wherein it is available to react with compounds that are reactive with hydroxyl groups.

Disclosed herein is an oligomeric polyol composition comprising an oligomeric polyol comprising an oligomeric network and one or more peripheral groups which are hydrocarbyl groups comprising at least one pendant hydroxyl group. The hydrocarbyl groups may be bound to the oligomeric network by a plurality of linking units such are disclosed herein. The hydrocarbyl groups may be aromatic radicals, cycloaliphatic radicals, aliphatic radicals or a combination of such radicals. In one or more instances, at least a portion of the linking units are oxygen atoms of hydrocarbyl ether linkages which may constitute oxygen atoms of aromatic ether linkages, oxygen atoms of cycloaliphatic ether linkages, or oxygen atoms of aliphatic ether linkages.

Disclosed herein is an oligomeric polyol composition comprising an oligomeric polyol comprising an oligomeric network and one or more peripheral groups, wherein at least a portion of the peripheral groups are (i) aliphatic peripheral groups comprising a residue of at least one monomeric aliphatic polyol having at least two pendant hydroxyl groups; (ii) cycloaliphatic peripheral groups comprising a residue of at least one monomeric cycloaliphatic polyol having at least two pendant hydroxyl groups; (iii) aromatic peripheral groups comprising a residue of at least one monomeric aromatic polyol having at least two pendant hydroxyl groups; (iv) aromatic peripheral groups comprising a residue of at least one polyhydroxylated aromatic compound having at least one pendant hydroxyl group; (v) an adduct comprising at least one polyhydroxylated aromatic compound residue and at least one residue of an aliphatic polyol having at least two pendant hy-droxyl groups; (vi) an adduct comprising at least one polyhydroxy- lated aromatic compound resi-due and at least one residue of a cycloaliphatic polyol having at least two pendant hydroxyl groups; or (vii) an adduct comprising at least one polyhydroxylated aromatic compound residue and at least one or more residue of a monomeric aromatic polyol having at least two pendant hydroxyl groups.

As disclosed herein, the oligomeric polyol may comprise residues of a polyol as constituents of either or both of the oligomeric network and the peripheral groups, wherein the polyol residue and the polyol to which it relates comprise at least one methylene ether group. The polyol residue and the polyol to which it relates, may comprise primary hydroxyl groups, secondary hydroxyl groups, or a mixture of primary and secondary hydroxyl groups. The polyol residue and the monomeric polyol to which it relates, may comprise secondary hydroxyl groups and be substantially free of primary and tertiary hydroxyl groups. In some instances, the polyol residue and the polyol to which it relates, may comprise tertiary hydroxyl groups in addition to primary and/or secondary hydroxyl groups. Substantially free of primary and tertiary hydroxyl groups means that such hydroxyls groups comprise less than about 1 percent by weight of the described compositions, or less than about 0.5 percent by weight of the described compositions.

Disclosed herein is an oligomeric polyol composition comprising an oligomeric polyol comprising an oligomeric network and one or more peripheral groups, wherein either or both of the oligomeric network and the peripheral groups comprises residues of at least one polyol which is a polyhydroxylated amine. The polyhydroxylated amine residue and the polyhydroxylated amine to which it relates comprise secondary hydroxyl groups or residues thereof and may be substantially free of primary and tertiary hydroxyl groups or residues thereof.

The peripheral groups may be represented by

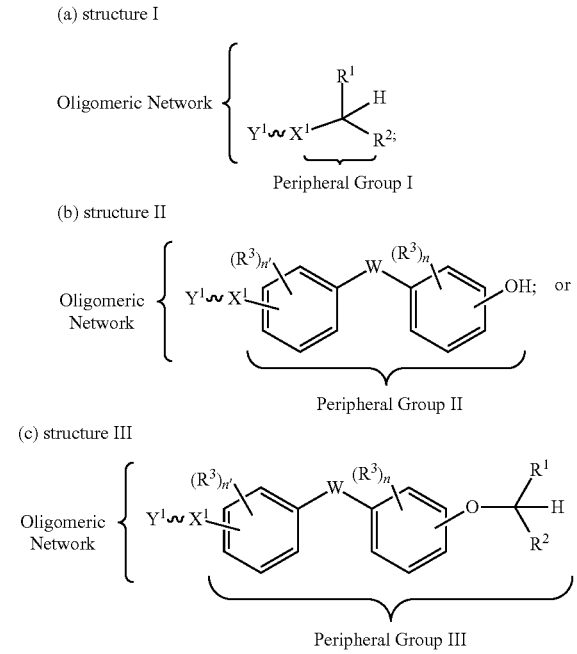

(a) structure I

Peripheral Group I (b) structure II

Peripheral Group II (c) structure III

Peripheral Group III wherein $R^1$ and $R^2$ are independently at each occurrence a hydrogen atom, or a hydrocarbyl group such that $R^1$ and $R^2$, either alone or together, comprise at least two hydroxyl groups wherein R¹ and/or R² optionally contain an internal functional group containing a heteroatom; R³ is independently at each occurrence a non-carbon substituent or a hydrocarbyl group; W is a bond or a linking group; the variables n and n' are independently an integer from 0 to 4; and X¹ is a linking unit joining peripheral group I, II or III to oligomeric network Y¹, oligomeric network Y¹ comprising residues of at least one bisphenol and residues of at least one monomeric polyol having at least three hydroxyl groups.

The oligomeric networks Y1 and linking units X1 are not constituents of peripheral groups I, II and III, but are shown to illustrate the relationship within an oligomeric polyol between the peripheral groups, the linking unit and the oligomeric network.

Disclosed herein is an oligomeric polyol composition comprising an oligomeric polyol comprising an oligomeric network and one or more peripheral groups, wherein at least a portion of the peripheral groups comprise a residue of a polyol and have structure I

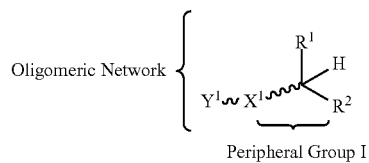

Peripheral Group I wherein R¹ and R² are independently at each occurrence a hydrogen atom, a $C_1$-$C_{30}$ aliphatic radical, a $C_5$-$C_{30}$ cycloaliphatic radical, or a $C_6$-$C_{30}$ aromatic radical, or R¹ and R² may together form a $C_5$-$C_{30}$ cycloaliphatic radical or a $C_6$-$C_{30}$ aromatic radical; with the proviso that R¹ and R², either alone or together, comprise at least two hydroxyl groups, wherein R¹ and/or R² optionally contain an internal functional group containing a heteroatom; and X¹ is a linking unit joining peripheral group I to oligomeric network Y¹, oligomeric network Y¹ comprising residues of at least one bisphenol and residues of at least one monomeric polyol having at least three hydroxyl groups.

Additionally, R1 and R2 are independently at each occurrence a hydrogen atom, a C1-C25 aliphatic radical, a C5-C25 cycloaliphatic radical, or a C6-C25 aromatic radical, or R1 and R2 may together form a C5-C30 cycloaliphatic radical or a C6-C30 aromatic radical; with the proviso that R1 and R2, either alone or together, comprise at least two hydroxyl groups, wherein R1 and/or R2 optionally contain an internal functional group containing a heteroatom; and X1 is a linking unit joining peripheral group I to oligomeric network Y1, oligomeric network Y1 comprising residues of at least one bisphenol and residues of at least one monomeric polyol having at least three hydroxyl groups.

Further, R1 and R2 are independently at each occurrence a hydrogen atom, a C1-C19 aliphatic radical, a C5-C19 cycloaliphatic radical, or a C6-C22 aromatic radical; with the proviso that R1 and R2, either alone or together, comprise at least two hydroxyl groups, wherein R1 and/or R2 optionally contain an internal functional group containing a heteroatom which is an oxygen atom, a sulfur atom or a nitrogen atom; and X1 is a linking unit joining peripheral group I to oligomeric network Y1, oligomeric network Y1 comprising residues of at least one bisphenol and residues of at least one monomeric polyol having at least three hydroxyl groups.

Specific examples of peripheral groups having structure I are given in Table 1.

TABLE 1

| | Illustrative Peripheral Groups I | | | |
|---|---|---|---|---|
| Entry | Structure | X¹ | R¹ | R² |
| Ia | (structure) | O | CH₃ | See Structure |
| Ib | (structure) | OCOO | CH₃ | See Structure |

TABLE 1-continued
| | Illustrative Peripheral Groups I | | | |
|---|---|---|---|---|
| Entry | Structure | $X^1$ | $R^1$ | $R^2$ |
| Ic | 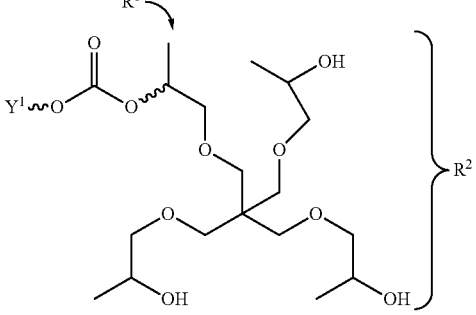 | OCOO | $CH_3$ | See Structure |
| Id | 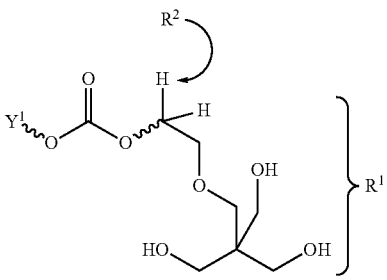 | OCOO | See structure | H |
| Ie | 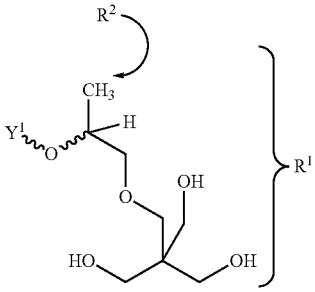 | O | See Structure | $CH_3$ |
| If | 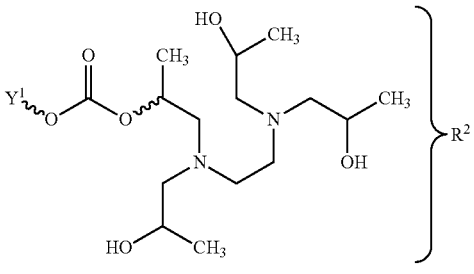 | OCOO | $CH_3$ | See structure |
| Ig | 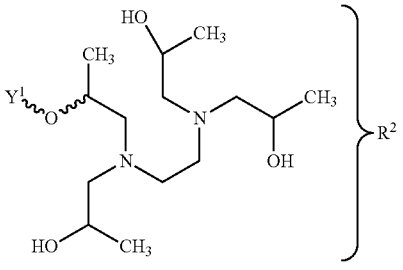 | O | $CH_3$ | See structure |

TABLE 1-continued
Illustrative Peripheral Groups I
| Entry | Structure | $X^1$ | $R^1$ | $R^2$ |
|---|---|---|---|---|
| Ih | 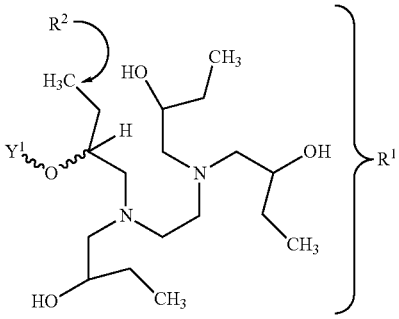 | O | See structure | Et |
| Ii | 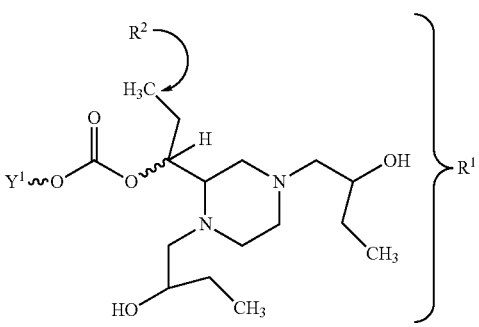 | OCOO | See structure | Et |
| Ij | 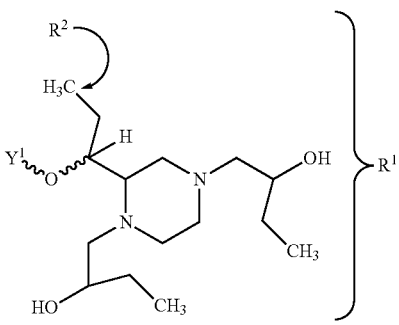 | O | See structure | Et |
| Ik | 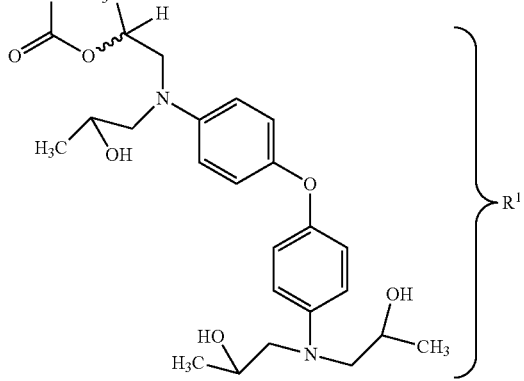 | OCOO | See structure | $CH_3$ |

TABLE 1-continued
Illustrative Peripheral Groups I
| Entry | Structure | X¹ | R¹ | R² |
|---|---|---|---|---|
| Il | 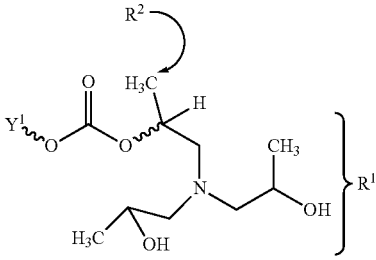 | OCOO | See structure | CH₃ |
| Im | 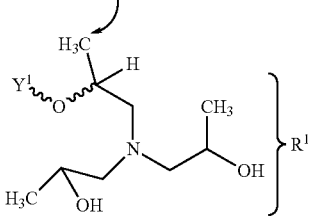 | O | See structure | CH₃ |
| In | 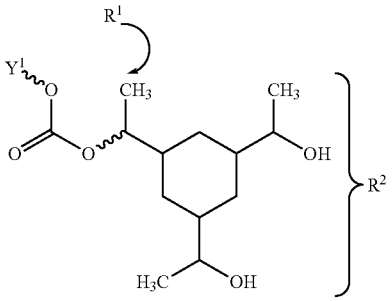 | OCOO | CH₃ | See structure |
| Io | 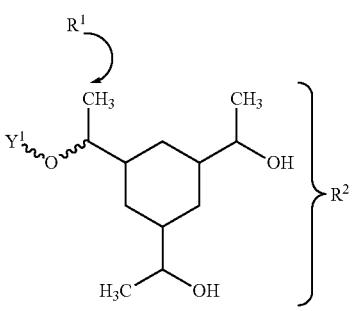 | O | CH₃ | See Structure |

TABLE 1-continued

Illustrative Peripheral Groups I

| Entry | Structure | $X^1$ | $R^1$ | $R^2$ |
|---|---|---|---|---|
| Ip | 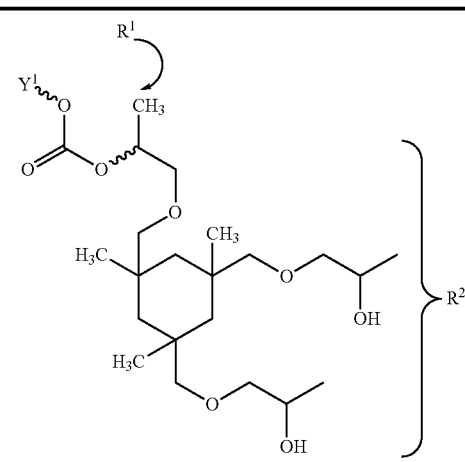 | OCOO | $CH_3$ | See structure |
| Iq | 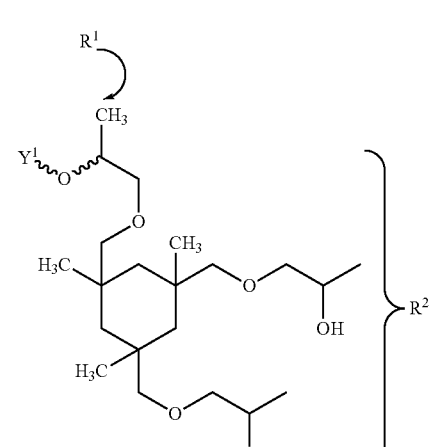 | O | $CH_3$ | See Structure |
| Ir | 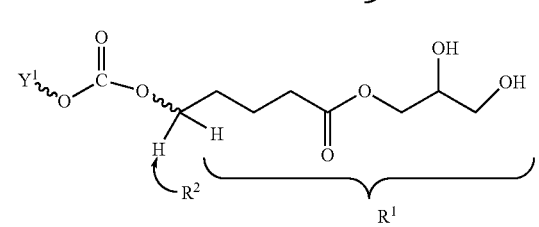 | OCOO | H | See Structure |

Illustrative peripheral groups I represent aliphatic peripheral groups, Entries Ia-Ih, Il-Im and Ir; cycloaliphatic peripheral groups, Entries Ii-Ij, In, and Io-Iq; and aromatic peripheral groups, Entry Ik, bound to an oligomeric network Y1 by a linking unit X1 which is an oxygen ether single atom linking unit, or a multi-atom linking unit which is a carbonate linking unit.

Disclosed herein is an oligomeric polyol composition comprising an oligomeric polyol comprising an oligomeric network and one or more peripheral groups, wherein at least a portion of the peripheral groups comprise a residue of a bisphenol and have structure II

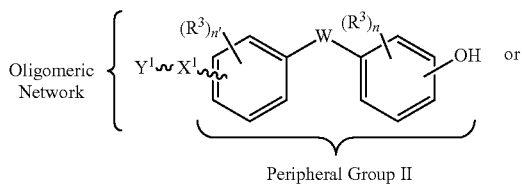

Peripheral Group II wherein $R^3$ is independently at each occurrence a halogen atom, a nitro group, a $C_1$-$C_{10}$ aliphatic radical, a $C_5$-$C_{10}$ cycloaliphatic radical, or a $C_6$-$C_{20}$ aromatic radical; W is a bond or a linking oxygen atom, a sulfur atom, a sulfur oxide linking group, a $C_1$-$C_{10}$ aliphatic radical, a $C_5$-$C_{10}$ cycloaliphatic radical, or a $C_6$-$C_{30}$ aromatic radical; the variables n and n' are independently an integer from 0 to 4; and $X^1$ is a linking unit joining peripheral group II to oligomeric network $Y^1$, oligomeric network $Y^1$ comprising residues of at least one bisphenol and residues of at least one monomeric polyol having at least three hydroxyl groups.

Additionally, R3 is independently at each occurrence a halogen atom, a nitro group, a C1-C5 aliphatic radical, a C5-C10 cycloaliphatic radical, or a C6-C10 aromatic radical; W is a bond or a linking oxygen atom, a sulfur atom, a sulfur oxide linking group, a C1-C5 aliphatic radical, a C5-C10 cycloaliphatic radical, or a C6-C15 aromatic radical; the variables n and n' are independently an integer from 0 to 4; and X1 is a linking unit joining peripheral group II to oligomeric network Y1, oligomeric network Y1 comprising residues of at least one bisphenol and residues of at least one monomeric polyol having at least three hydroxyl groups.

Further, R3 is independently at each occurrence a halogen atom, a C1-C2 aliphatic radical, a C5-C8 cycloaliphatic radical, or a C6-C10 aromatic radical; W is a bond or a linking oxygen atom, a sulfur atom, a sulfur oxide linking group, a C1-C3 aliphatic radical, a C5-C9 cycloaliphatic radical, or a C6-C13 aromatic radical; the variables n and n' are independently an integer from 0 to 2; and X1 is a linking unit joining peripheral group II to oligomeric network Y1, oligomeric network Y1 comprising residues of at least one bisphenol and residues of at least one monomeric polyol having at least three hydroxyl groups.

Specific examples of peripheral groups falling within generic structure II are given in Table 2.

TABLE 2

Illustrative Peripheral Groups II

| Entry | Structure | $X^1$ | $R^3$ | $R^3$ | n' | n |
|---|---|---|---|---|---|---|
| IIa | $Y^1$−O−C$_6$H$_4$−C(CH$_3$)$_2$−C$_6$H$_4$−OH (W = C(CH$_3$)$_2$) | O | — | — | 0 | 0 |
| IIb | $Y^1$−O−(3-CH$_3$-C$_6$H$_3$)−C(CH$_3$)$_2$−(3-CH$_3$-C$_6$H$_3$)−OH (W = C(CH$_3$)$_2$) | O | CH$_3$ | CH$_3$ | 1 | 1 |
| IIc | $Y^1$−O−C$_6$H$_4$−SO$_2$−C$_6$H$_4$−OH (W = SO$_2$) | O | — | — | 0 | 0 |
| IId | $Y^1$−O−(3,5-Cl$_2$-C$_6$H$_2$)−O−(3,5-Cl$_2$-C$_6$H$_2$)−OH (W = O) | O | Cl | Cl | 2 | 2 |
| IIe | $Y^1$−O−C(=O)−O−(3-Br-C$_6$H$_3$)−O−(3-Br-C$_6$H$_3$)−OH (W = O) | OCOO | Br | Br | 1 | 1 |

TABLE 2-continued
Illustrative Peripheral Groups II
| Entry | Structure | X¹ | R³ | R³ | n' | n |
|---|---|---|---|---|---|---|
| IIf | 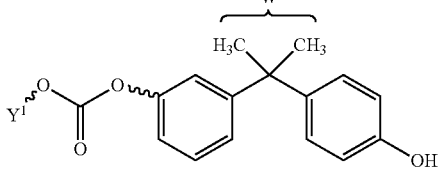 | OCOO | — | — | 0 | 0 |
| IIg | 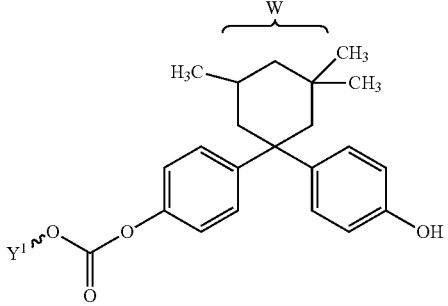 | OCOO | — | — | 0 | 0 |
| IIh | 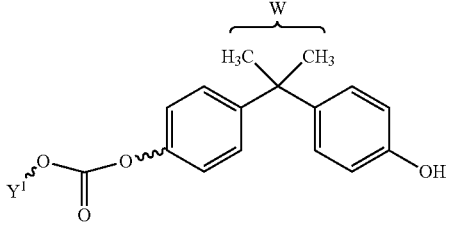 | OCOO | — | — | 0 | 0 |
| IIi | 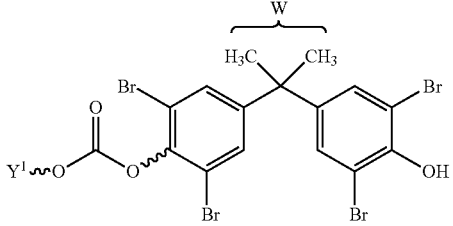 | OCOO | 2 | 2 | Br | Br |
| IIj | 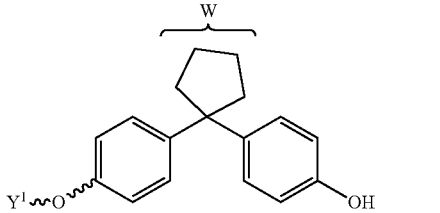 | O | — | — | 0 | 0 |
| IIk | 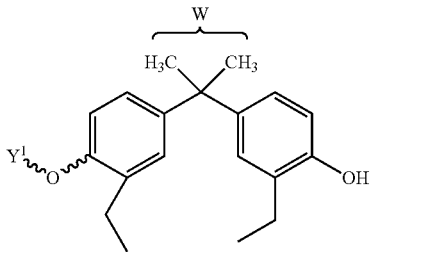 | O | Et | Et | 1 | 1 |

TABLE 2-continued
Illustrative Peripheral Groups II
| Entry | Structure | X¹ | R³ | R³ | n' | n |
|---|---|---|---|---|---|---|
| IIl | 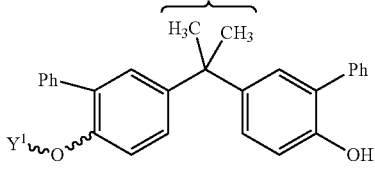 | O | Ph | Ph | 1 | 1 |
| IIm | 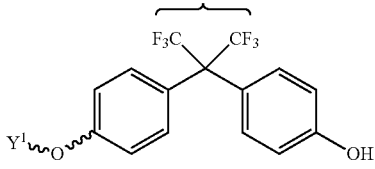 | O | — | — | 0 | 0 |
| IIn | 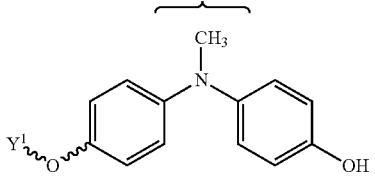 | O | — | — | 0 | 0 |
| IIo | 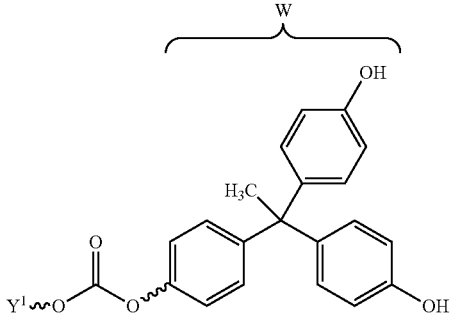 | OCOO | — | — | 0 | 0 |
| IIp | 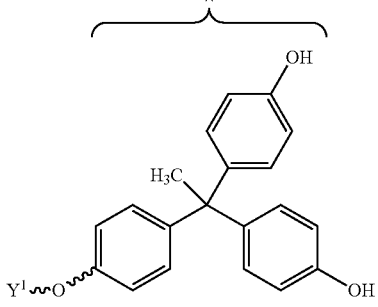 | O | — | — | 0 | 0 |
| IIq | 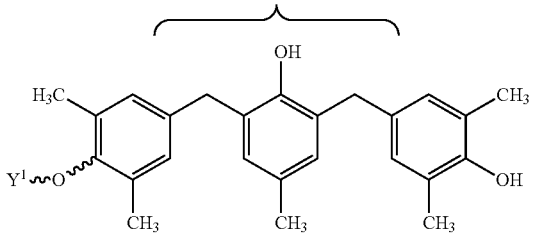 | O | CH₃ | CH₃ | 2 | 2 |

TABLE 2-continued

Illustrative Peripheral Groups II

| Entry | Structure | X¹ | R³ | R³ | n' | n |
|---|---|---|---|---|---|---|
| IIr | 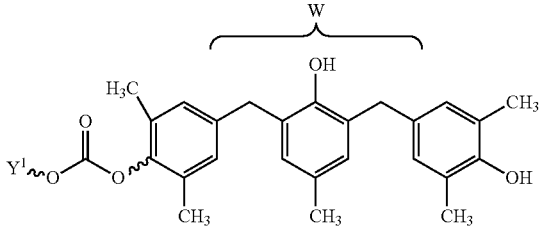 | OCOO | CH₃ | CH₃ | 2 | 2 |
| IIs | 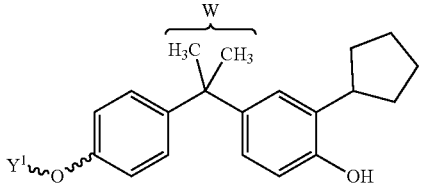 | O |  | — | 1 | 0 |
| IIt | 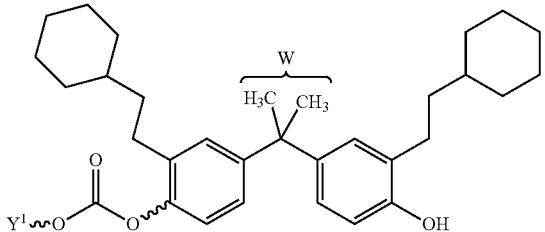 | OCOO | 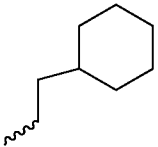 | 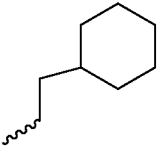 | 1 | 1 |
| IIu | 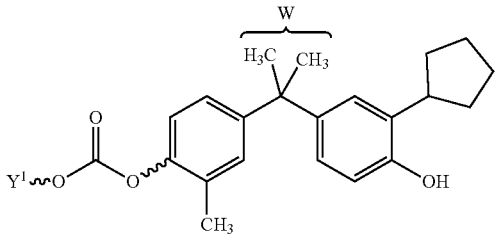 | OCOO | CH₃ |  | 1 | 1 |
| IIv | 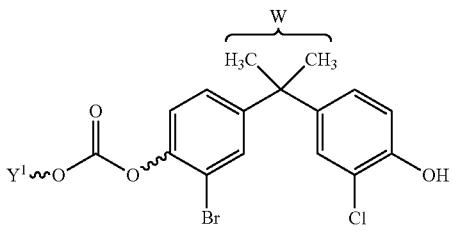 | OCOO | Br | Cl | 1 | 1 |

Illustrative peripheral groups IIa-IIv represent aromatic peripheral groups comprised of residues of a bisphenol and comprising one or more pendant hydroxy groups. Peripheral groups II are bound to an oligomeric network Y1 of the oligomeric polyol by a linking unit which is an oxygen ether single atom linking unit, Entries IIa-IId, IIj-IIn, IIp-IIq and IIs (oxygen), or a multi-atom linking unit which is a carbonate linking unit, Entries IIe-IIh, IIo, IIr and IIu-IIv.

Disclosed herein is an oligomeric polyol composition comprising an oligomeric polyol comprising an oligomeric network and one or more peripheral groups, wherein at least a portion of the peripheral groups comprise a residue of a monomeric polyol linked through a residue of a bisphenol and a linking unit to the oligomeric network, and have structure III

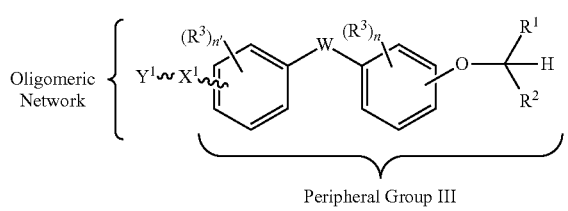

Peripheral Group III wherein $R^1$ and $R^2$ are independently at each occurrence a hydrogen atom, a $C_1$-$C_{30}$ aliphatic radical, a $C_5$-$C_{30}$ cycloaliphatic radical, a $C_6$-$C_{30}$ aromatic radical, or $R^1$ and $R^2$ may together form a $C_5$-$C_{30}$ cycloaliphatic radical or a $C_6$-$C_{30}$ aromatic radical; with the proviso that $R^1$ and $R^2$, either alone or together, comprise at least two hydroxyl groups, wherein $R^1$ and/or $R^2$ optionally contain an internal functional group containing a heteroatom; $R^3$ is independently at each occurrence a halogen atom, a nitro group, a $C_1$-$C_{10}$ aliphatic radical, a $C_5$-$C_{10}$ cycloaliphatic radical, or a $C_6$-$C_{20}$ aromatic radical; W is a bond or a linking oxygen atom, a sulfur atom, a sulfur oxide linking group, a $C_1$-$C_{10}$ aliphatic radical, a $C_5$-$C_{10}$ cycloaliphatic radical, or a $C_6$-$C_{20}$ aromatic radical; the variables n and n' are independently an integer from 0 to 4; and $X^1$ is a linking unit joining peripheral group III to oligomeric network $Y^1$, oligomeric network $Y^1$ comprising residues of at least one bisphenol and residues of at least one monomeric polyol having at least three hydroxyl groups.

Additionally, R1 and R2 are independently at each occurrence a hydrogen atom, a C1-C25 aliphatic radical, a C5-C25 cycloaliphatic radical, a C6-C25 aromatic radical, or R1 and R2 may together form a C5-C30 cycloaliphatic radical or a C6-C30 aromatic radical; with the proviso that R1 and R2, either alone or together, comprise at least two hydroxyl groups, wherein R1 and/or R2 optionally contain an internal functional group containing a heteroatom; R3 is independently at each occurrence a halogen atom, a nitro group, a C1-C5 aliphatic radical, a C5-C10 cycloaliphatic radical, or a C6-C10 aromatic radical; W is a bond or a linking oxygen atom, a sulfur atom, a sulfur oxide linking group, a C1-C5 aliphatic radical, a C5-C10 cycloaliphatic radical, or a C6-C15 aromatic radical; the variables n and n' are independently an integer from 0 to 4; and X1 is a linking unit joining peripheral group III to oligomeric network Y1, oligomeric network Y1 comprising residues of at least one bisphenol and residues of at least one monomeric polyol having at least three hydroxyl groups.

Further, R1 and R2 are independently at each occurrence a hydrogen atom, a C1-C19 aliphatic radical, a C5-C19 cycloaliphatic radical, or a C6-C22 aromatic radical; with the proviso that R1 and R2, either alone or together, comprise at least two hydroxyl groups, wherein R1 and/or R2 optionally contain an internal functional group containing a heteroatom which is an oxygen atom, a sulfur atom or a nitrogen atom; R3 is independently at each occurrence a halogen atom, a C1-C2 aliphatic radical, a C5-C8 cycloaliphatic radical, or a C6-C10 aromatic radical; W is a bond or a linking oxygen atom, a sulfur atom, a sulfur oxide linking group, a C1-C3 aliphatic radical, a C5-C9 cycloaliphatic radical, or a C6-C13 aromatic radical; the variables n and n' are independently an integer from 0 to 2; and X1 is a linking unit joining peripheral group III to oligomeric network Y1, oligomeric network Y1 comprising residues of at least one bisphenol and residues of at least one monomeric polyol having at least three hydroxyl groups.

Specific examples of peripheral groups having structure III are given in Table 3.

TABLE 3

Illustrative Peripheral Groups III

| Entry | Structure | $X^1$ | $R^3$ | $R^3$ | n' | n |
|---|---|---|---|---|---|---|
| IIIa | (structure) | O | — | — | 0 | 0 |
| IIIb | (structure) | O | $CH_3$ | $CH_3$ | 1 | 1 |

33 34
TABLE 3-continued
Illustrative Peripheral Groups III
| Entry | Structure | $X^1$ | $R^3$ | $R^3$ | n' | n |
|---|---|---|---|---|---|---|
| IIIc | 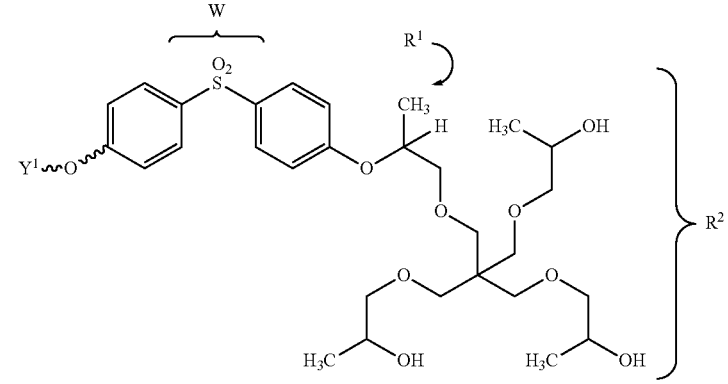 | O | — | — | 0 | 0 |
| IIId | 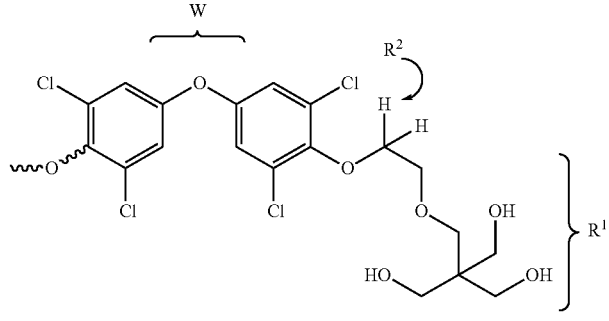 | O | Cl | Cl | 2 | 2 |
| IIIe | 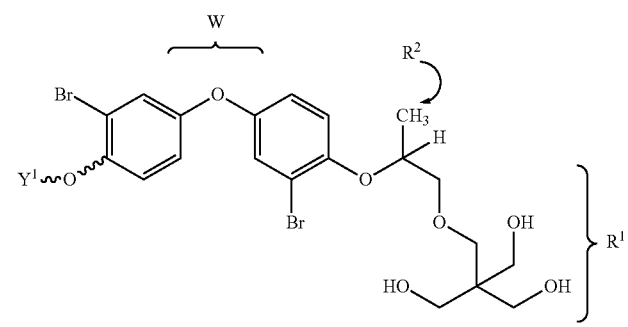 | O | Br | Br | 1 | 1 |
| IIIf | 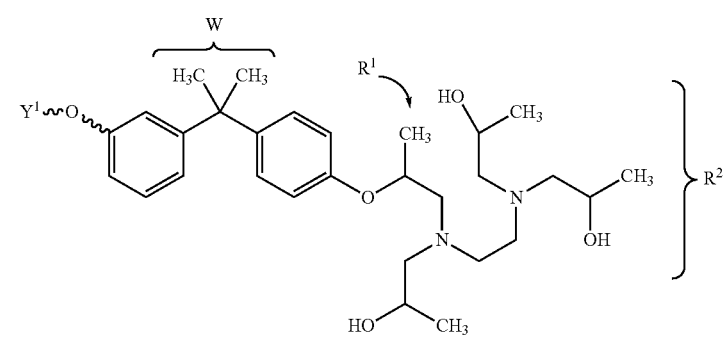 | O | — | — | 0 | 0 |

TABLE 3-continued
Illustrative Peripheral Groups III
| Entry | Structure | $X^1$ | $R^3$ | $R^3$ | n' | n |
|---|---|---|---|---|---|---|
| IIIg | 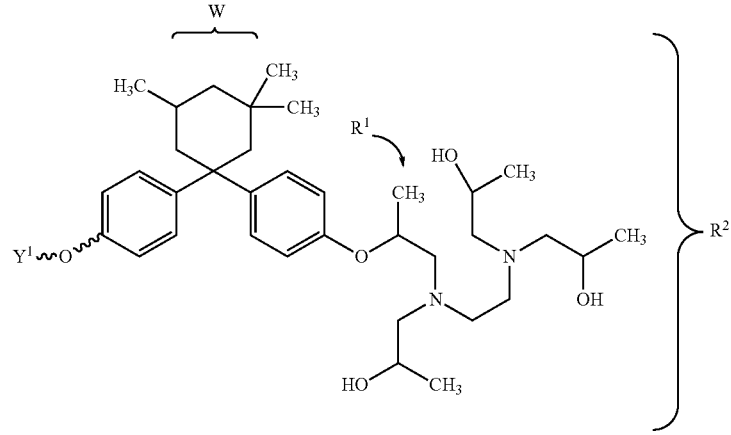 | O | — | — | 0 | 0 |
| IIIh | 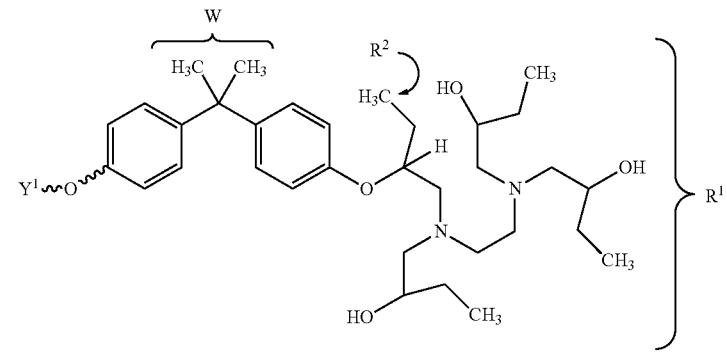 | | | | | |
| IIIi | 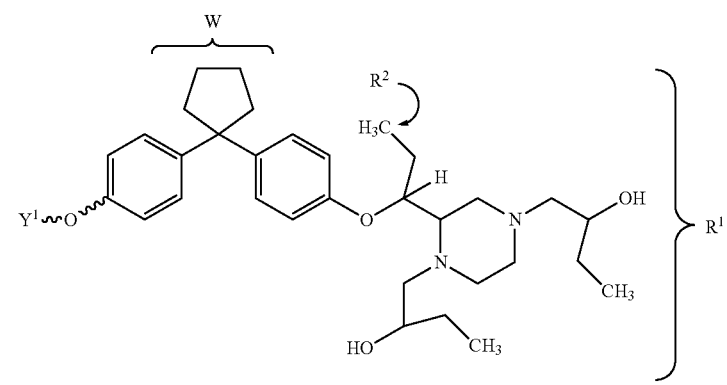 | O | — | — | 0 | 0 |

TABLE 3-continued

Illustrative Peripheral Groups III

| Entry | Structure | $X^1$ | $R^3$ | $R^3$ | n' | n |
|---|---|---|---|---|---|---|
| IIIj | | O | Et | Et | 1 | 1 |
| IIIk | | O | — | — | 0 | 0 |
| IIIl | | | | | | |

TABLE 3-continued

Illustrative Peripheral Groups III

| Entry | Structure | $X^1$ | $R^3$ | $R^3$ | n' | n |
|---|---|---|---|---|---|---|
| IIIm | (structure) | OCOO | — | — | 0 | 0 |
| IIIn | (structure) | OCOO | — | — | 0 | 0 |
| IIIo | (structure) | O | — | — | 0 | 0 |

Illustrative peripheral groups III represent aromatic peripheral groups and are comprised of residues of a bisphenol and a monomeric polyol and may be referred to herein as an adduct comprising at least one bisphenol residue and at least one residue of a monomeric polyol. The illustrated peripheral groups comprise a residue of the monomeric polyol bound through the residue of the bisphenol and a linking unit X1 to an oligomeric network Y1 and comprise two or more pendant hydroxy groups. Peripheral groups III are bound to an oligomeric network Y1 of the oligomeric polyol by a linking unit in which X1 is an oxygen ether or a carbonate group. In the illustrated peripheral groups IIIa-IIIo the residue of the outermost monomeric polyol residue is bound by an oxygen atom to the bisphenol residue. In an alternate set of illustrative examples (not shown), the residue of the outermost monomeric polyol residue is bound by a carbonate group to the bisphenol residue.

Disclosed herein is an oligomeric polyol composition comprising an oligomeric polyol comprising an oligomeric network and one or more peripheral groups, wherein the oligomeric network and at least a portion of the peripheral groups comprise a residue of a polyhydroxylated aromatic compound, such as a bisphenol. Polyhydroxylated aromatic compounds to which such residues relate include compounds which correspond to the formula Ar—(OH)f wherein Ar comprises an aromatic moiety as disclosed herein and f is an integer of about 2 to about 6, or 2 to 4. The polyhydroxylated aromatic compounds may be diphenols. Exemplary diphenols include hydroquinone, resorcinol, dihydroxybiphenyls, bis(hydroxyphenyl)-C1-C5 alkanes, bis- (hydroxy-phenyl)-C5-C6 cycloalkanes, bis(hydroxyphenyl) ethers, bis(hydroxyphenyl)sulfoxides, bis(hydroxy phenyl) ketones, bis(hydroxyphenyl)sulfones and 4,4"-bis(hydroxy-phenyl)diisopropyl benzenes, as well as derivatives thereof which have brominated and/or chlorinated nuclei. Exemplary diphenols may be 4,4'-dihydroxybiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethyl-cyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl) propane, 2,2-bis-(3,5-dichloro-4-hydroxyphenyl)propane or 2,2-bis(3,5-dibromo-4-hydroxy-phenyl)propane. The diphenols can be used individually or as arbitrary mixtures. The diphenols may be bisphenols to which such residues relate include bisphenols having structure IV

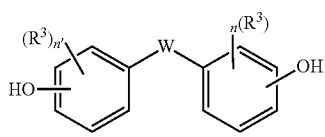

IV wherein $R^3$ is independently at each occurrence a halogen atom, a nitro group, a C1-C10 aliphatic radical, a $C_5$-$C_{10}$ cycloaliphatic radical, or a $C_6$-$C_{20}$ aromatic radical; W is a bond or a linking oxygen atom, a sulfur atom, a sulfur oxide linking group, a $C_1$-$C_{10}$ aliphatic radical, a $C_5$-$C_{10}$ cycloaliphatic radical, or a $C_6$-$C_{20}$ aromatic radical; and the variables n and n' are independently an integer from 0 to 4.

Additionally, R3 is independently at each occurrence a halogen atom, a nitro group, a C1-C5 aliphatic radical, a C5-C10 cycloaliphatic radical, or a C6-C10 aromatic radical; W is a bond or a linking oxygen atom, a sulfur atom, a sulfur oxide linking group, a C1-C5 aliphatic radical, a C5-C10 cycloaliphatic radical, or a C6-C15 aromatic radical; and the variables n and n' are independently an integer from 0 to 4.

Further, R3 is independently at each occurrence a halogen atom, a C1-C2 aliphatic radical, a C5-C8 cycloaliphatic radical, or a C6-C10 aromatic radical; W is a bond or a linking oxygen atom, a sulfur atom, a sulfur oxide linking group, a C1-C3 aliphatic radical, a C5-C9 cycloaliphatic radical, or a C6-C13 aromatic radical; and the variables n and n' are independently an integer from 0 to 2.

TABLE 4

Illustrative Aromatic Bisphenols IV

| Entry | Structure | $R^3$ | $R^3$ | n' | n |
|---|---|---|---|---|---|
| IVa | (4,4'-isopropylidenediphenol / bisphenol A) | — | — | 0 | 0 |
| IVb | (tetramethyl bisphenol A derivative) | CH₃ | CH₃ | 1 | 1 |
| IVc | (4,4'-sulfonyldiphenol) | — | — | 0 | 0 |
| IVd | (tetrachloro diphenyl ether diol) | Cl | Cl | 2 | 2 |

TABLE 4-continued

Illustrative Aromatic Bisphenols IV

| Entry | Structure | R³ | R³ | n' | n |
|-------|-----------|----|----|----|----|
| IVe | 3,3'-dibromo-4,4'-dihydroxydiphenyl ether (bridge W = O) | Br | Br | 1 | 1 |
| IVf | 2-(3-hydroxyphenyl)-2-(4-hydroxyphenyl)propane (bridge W = C(CH₃)₂) | — | — | 0 | 0 |
| IVg | 1,1-bis(4-hydroxyphenyl)-3,3,5-trimethylcyclohexane | — | — | 0 | 0 |
| IVh | 2-(3-ethyl-4-hydroxyphenyl)-2-(4-hydroxyphenyl)propane | Et | — | 1 | 0 |
| IVi | 2,2-bis(3-ethyl-4-hydroxyphenyl)propane | Et | Et | 1 | 1 |
| IVj | 1,1-bis(4-hydroxyphenyl)cyclopentane | — | — | 0 | 0 |

TABLE 4-continued
Illustrative Aromatic Bisphenols IV
| Entry | Structure | R³ | R³ | n' | n |
|---|---|---|---|---|---|
| IVk | 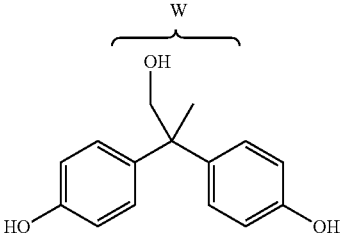 | — | — | 0 | 0 |
| IVl | 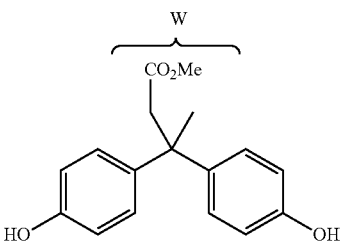 | — | — | 0 | 0 |
| IVm | 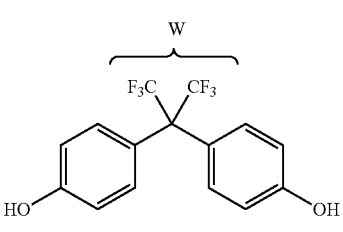 | — | — | 0 | 0 |
| IVn | 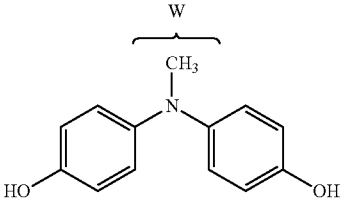 | — | — | 0 | 0 |
| IVo | 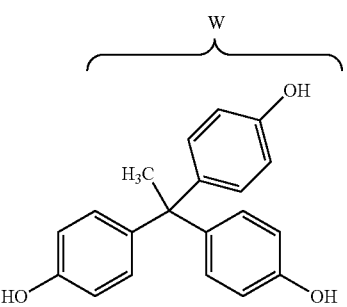 | — | — | 0 | 0 |
| IVp | 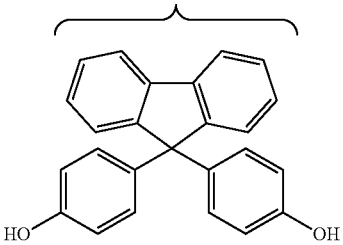 | — | — | 0 | 0 |

TABLE 4-continued
Illustrative Aromatic Bisphenols IV
| Entry | Structure | R³ | R³ | n' | n |
|---|---|---|---|---|---|
| IVq | 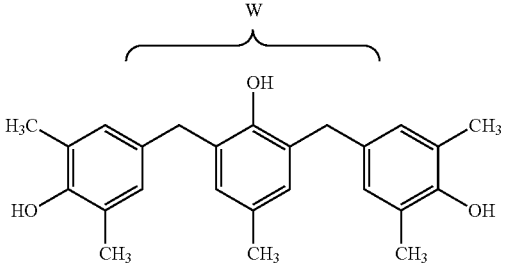 | CH₃ | CH₃ | 2 | 2 |
| IVr | 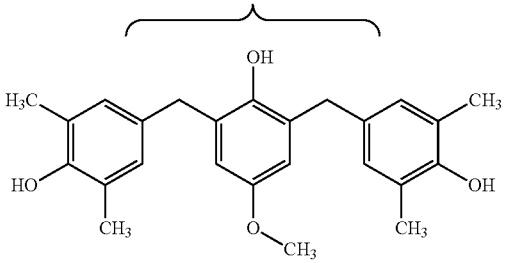 | CH₃ | CH₃ | 2 | 2 |
| IVs | 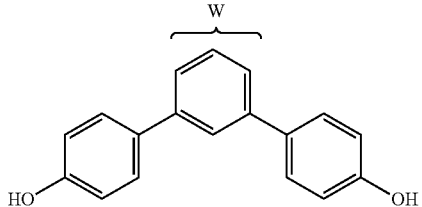 | — | — | 0 | 0 |
| IVt | 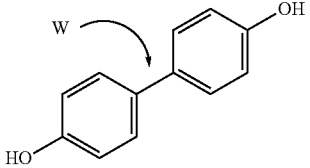 | — | — | 0 | 0 |
| IVu | 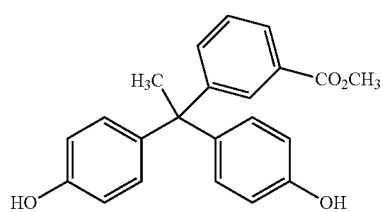 | — | — | 0 | 0 |

TABLE 4-continued

Illustrative Aromatic Bisphenols IV

| Entry | Structure | $R^3$ | $R^3$ | n' | n |
|---|---|---|---|---|---|
| IVv | 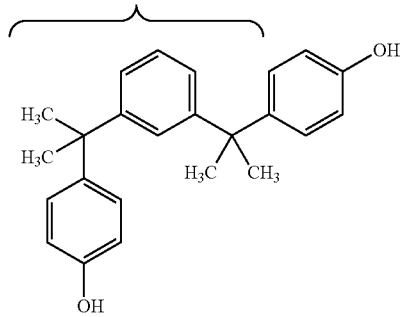 | — | — | 0 | 0 |

Disclosed herein is an oligomeric polyol composition comprising an oligomeric polyol comprising an oligomeric network and one or more peripheral groups, wherein the oligomeric network and at least a portion of the peripheral groups comprise residues of one or more polyols. Polyols to which such resides relate include polyols having structure V

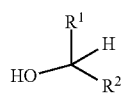

V wherein $R^1$ and $R^2$ are independently at each occurrence a hydrogen atom, a $C_1$-$C_{30}$ aliphatic radical, a $C_5$-$C_{30}$ cycloaliphatic radical, a $C_6$-$C_{30}$ aromatic radical, or $R^1$ and $R^2$ may together form a $C_5$-$C_{30}$ cycloaliphatic radical or a $C_6$-$C_{30}$ aromatic radical; with the proviso that $R^1$ and $R^2$, either alone or together, comprise at least two hydroxyl groups, wherein $R^1$ and/or $R^2$ optionally contain an internal functional group containing a heteroatom.

Additionally, R1 and R2 are independently at each occurrence a hydrogen atom, a C1-C25 aliphatic radical, a C5-C25 cycloaliphatic radical, or a C6-C25 aromatic radical, or R1 and R2 may together form a C5-C30 cycloaliphatic radical or a C6-C30 aromatic radical; with the proviso that R1 and R2, either alone or together, comprise at least two hydroxyl groups, wherein R1 and/or R2 optionally contain an internal functional group containing a heteroatom.

Further, R1 and R2 are independently at each occurrence a hydrogen atom, a C1-C19 aliphatic radical, a C5-C19 cycloaliphatic radical, or a C6-C22 aromatic radical; with the proviso that R1 and R2, either alone or together, comprise at least two hydroxyl groups, wherein R1 and/or R2 optionally contain an internal functional group containing a heteroatom which is an oxygen atom, a sulfur atom or a nitrogen atom.

Specific examples of polyols V are given in Table 5.

TABLE 5

Illustrative Monomeric Polyols V

| Entry | Structure | $R^1$ | $R^2$ |
|---|---|---|---|
| Va | 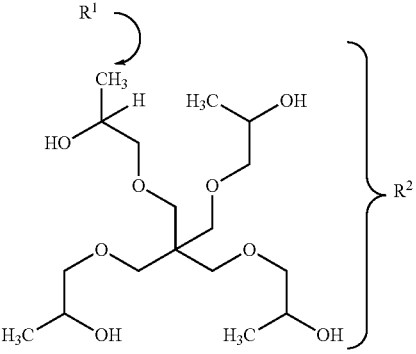 | $CH_3$ | See Structure |

TABLE 5-continued
Illustrative Monomeric Polyols V
| Entry | Structure | R¹ | R² |
|---|---|---|---|
| Vb | 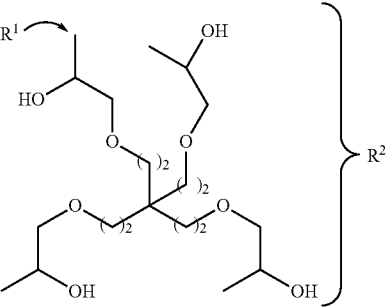 | CH₃ | See Structure |
| Vc | 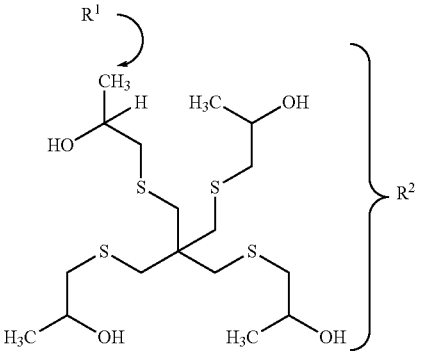 | CH₃ | See Structure |
| Vd | 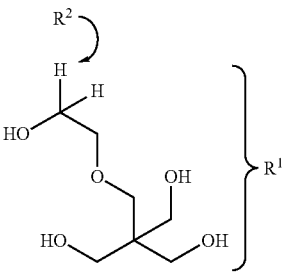 | See structure | H |
| Ve | 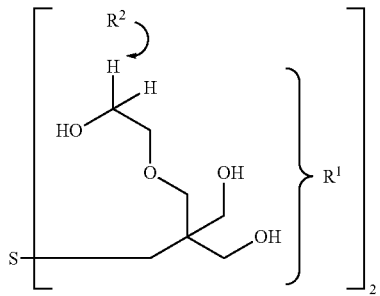 | See Structure | CH₃ |

TABLE 5-continued
Illustrative Monomeric Polyols V
| Entry | Structure | R[1] | R[2] |
|---|---|---|---|
| Vf | 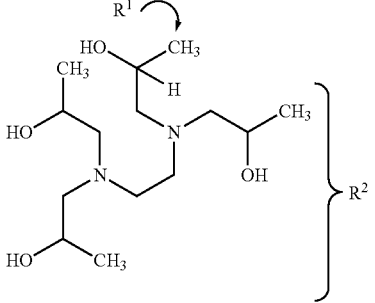 | CH$_3$ | See Structure |
| Vg | 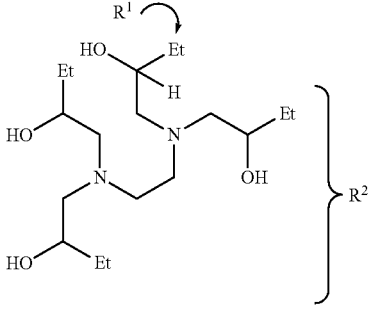 | Et | See Structure |
| Vh | 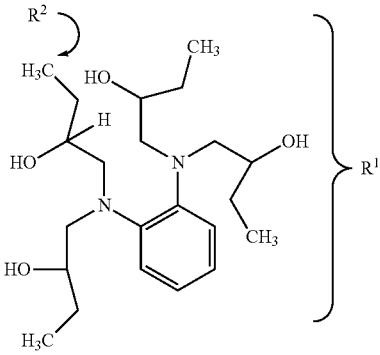 | See structure | Et |
| Vi | 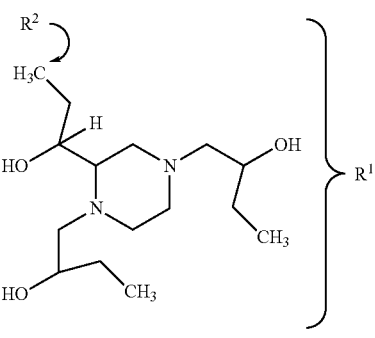 | See Structure | Et |

TABLE 5-continued

Illustrative Monomeric Polyols V

| Entry | Structure | R¹ | R² |
|---|---|---|---|
| Vj | (piperazine with two N-CH2-CH(OH)-CH3 groups and one CH(OH)-CH3 substituent on ring carbon) = R¹ | See Structure | CH₃ |
| Vk | (bis(4-aminophenyl) ether with each N bearing two -CH2-CH(OH)-CH3 groups) = R¹ | See Structure | CH₃ |
| Vl | N(CH2-CH(OH)-CH3)3 = R¹ | See Structure | CH₃ |
| Vm | N(CH2-CH(OH)-Et)3 = R¹ | See Structure | Et |
| Vn | 1,3,5-cyclohexane with three -CH(OH)-CH3 substituents = R² | CH₃ | See Structure |

TABLE 5-continued

Illustrative Monomeric Polyols V

| Entry | Structure | R¹ | R² |
|---|---|---|---|
| Vo | [structure of cyclohexane with three CH₃ groups and three –CH₂–O–CH₂–CH(OH)–CH₃ substituents, bracketed as R²] | CH₃ | See Structure |
| Vp | [structure: HO–CH(CH₃)–CH₂–CH(OH)–CH₂–CH(CH₃)–OH, with R¹ and R² brackets] | HO–CH₂–CH(CH₃)– (CH₃ with HO) | –CH(CH₃)–CH₂–OH |
| Vq | [structure: HO–CH₂–CH₂–CH(OH)–CH₂–CH₂–OH, with R¹ and R² brackets] | HO–CH₂–CH₂– | –CH₂–CH₂–OH |
| Vr | [structure: HO–CH₂–CH(OH)–CH(OH)–CH(OH)–CH₂–OH, with R¹ and R² brackets] | HO–CH₂–CH(OH)– | –CH(OH)–CH₂–OH |
| Vs | [structure: HO–CH₂–CH(OH)–CH₂–OH] | HO–CH₂– | –CH₂–OH |
| Vt | [structure: central C with three –CH₂–O–CH₂–CH(OH)–CH₃ groups and one –CH₂–OH, bracketed as R²] | CH₃ | See Structure |

TABLE 5-continued

Illustrative Monomeric Polyols V

| Entry | Structure | R¹ | R² |
|---|---|---|---|
| Vu | 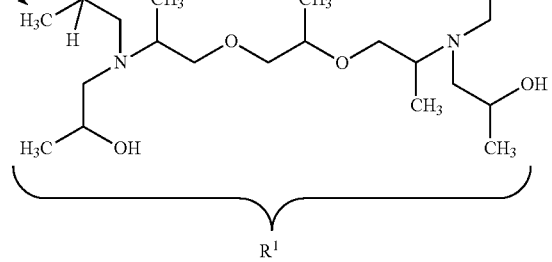 | See Structure | CH₃ |
| Vv | 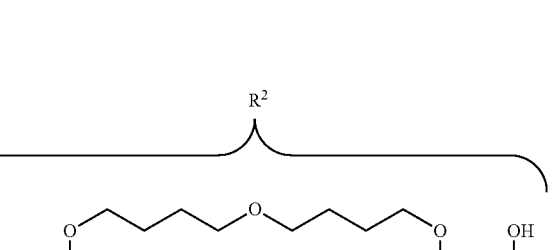 | H | See Structure |
| Vw | 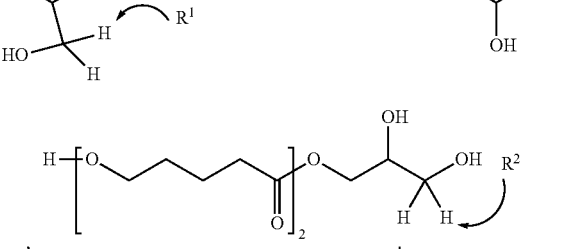 | See structure | H |
| Vx | 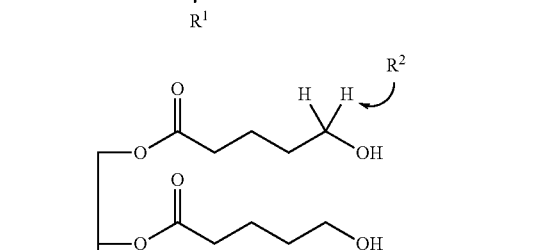 | See structure | H |

Illustrative polyols Va-Vv represent aliphatic polyols, Entries Va-Vh, Vl-Vm and Vp-Vx; cycloaliphatic polyols, Entries Vi-Vj and Vn-Vo; and aromatic polyols, Entries Vh and Vk. Aliphatic polyols Vw and Vx represent ester polyols.

Exemplary chain terminators used in aromatic polycarbonates include phenolic compounds, exemplary phenolic compounds include phenol, p-chlorophenol, p-tert-butylphenol, 4-(1,3-dimethyl-butyl)-phenol and 2,4,6-tribromophenol; long chain alkylphenols, such as monoalkylphenols or dialkylphenols which contain a total of 8 to 20 carbon atoms in their alkyl substituents, specific examples include 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. Exemplary branching agents tri- or multi-functional phenols for example phloroglucinol, 4,6-dimethyl-2,4,6-tris(4-hydroxyphenyl)-

2-heptene, 4,4-dimethyl-2,4,6-tris(4-hydroxyphenyl) heptane, 1,3,5-tris(4-hydroxyphenyl)benzene, 1,1,1-tris(4-hydroxyphenyl)ethane, tris(4-hydroxyphenyl)-phenylmethane, 2,2-bis[4,4-bis(4-hydroxyphenyl)cyclohexyl]-propane, 2,4-bis [1-(4-hydroxyphenyl)-1-methylethyl] phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl) propane, or tetrakis(4-[1-(4-hydroxyphenyl)-1-methylethyl]-phenoxy)-methane.

The oligomeric polyol compositions comprising oligomeric polyols may be prepared by reacting a polyol or a suitable polyol derivative with a polyhydroxylated aromatic compound, such as a bisphenol or a polyhydroxylated aromatic compound derivative, such as a bisphenol derivative, under conditions promoting the formation of an oligomeric network comprising polyhydroxylated aromatic compound residues, such as bisphenol residues, and polyol residues, the oligomeric network being linked to a plurality of peripheral groups comprising one or more hydroxyl groups. The reaction may advantageously be carried out in the presence of a catalyst or non-catalyst promoter. Illustrative catalysts and promoters include organic bases, inorganic bases, metal oxides, and organometallics. Catalysts are distinguished from promoters in that promoters are consumed during the formation of the oligomeric polyol whereas catalysts are not consumed. Illustrative organic bases include salts of carboxylic acids such as sodium acetate and tri-octyl ammonium isovalerate; salts of sulfonic acids such as sodium dodecyl sulfonate, amine bases, such as trialkyl amines exemplified by tri-butyl amine, N,N'-tetra-isopropyl ethylene diamine, polyhydroxylated amines such as tris(hydroxypropyl)amine and amine-containing monomeric polyols such as Vf-Vm in Table 5 herein; amidine bases such as N,N'-tri-isopropyl phenyl amidine and N,N'-tri-methyl butyl amidine, and guanidine bases such as Barton-Elliott bases illustrated by N,N',N"-penta-isopropyl guanidine. Illustrative inorganic bases include metal carbonates such as sodium carbonate, potassium carbonate, magnesium carbonate and barium carbonate; metal hydroxides such as lithium hydroxide, sodium hydroxide, potassium hydroxide and barium hydroxide; illustrative metal oxides include aluminum oxide, silica, calcium oxide, magnesium oxide, tin oxide, and zinc oxide; and illustrative organometallics include tri-isopropyl aluminate, tetraalkyl zirconates, and organometallic transesterification catalysts such as tetra-isopropyl titanate and tetra-octyl titanate.

The formation of the oligomeric polyol may occur by activation of a primary or secondary hydroxyl group of the polyol toward displacement by an oxygen atom of the polyhydroxylated aromatic compound, such as a bisphenol residue. Such activation is conveniently achieved by contacting the polyol at moderate temperatures, for example of about 50° C. or greater about 75° C. or greater, or about 100° C. or greater and for example of about 250° C. or less, or about 225° C. or less, or about 200° C. or less, with a polyhydroxylated aromatic compound, such as a bisphenol residue, containing one or more carbonate linkages in the presence of a suitable catalyst or promoter. The activation of a polyol hydroxyl group can be effected, for example, by causing a hydroxyl group of the polyol to react with a carbonate linkage of an oligomeric or polymeric bisphenol polycarbonate in the presence of a catalyst or promoter such as those disclosed herein to generate a mixed carbonate linkage between the monomeric polyol and a bisphenol residue. This mixed carbonate linkage undergoes loss of carbon dioxide and formation of an aromatic ether linkage between the bisphenol residue and the residue of the polyol. The mechanism by which the aromatic ether linkage is formed may involve loss of carbon dioxide from the mixed carbonate linkage and recombination of the reactive bisphenol and polyol components, or by displacement of the carbonate linkage by nucleophic attack by a phenolate species. In one such scenario, a nucleophic bisphenol species is created as the mixed carbonate linkage is formed. This nucleophic bisphenol species in turn attacks the carbon atom of the polyol bearing the newly created mixed carbonate linkage and forms an ether linkage between the bisphenol species and the polyol residue. While not wishing to be bound by the theory just described, those of ordinary skill in the art will appreciate its plausibility and that it accounts for the results observed. The process is shown schematically in Scheme 1 in which the nucleophilic bisphenol species is shown for illustrative purposes as a phenolate species.

Scheme 1

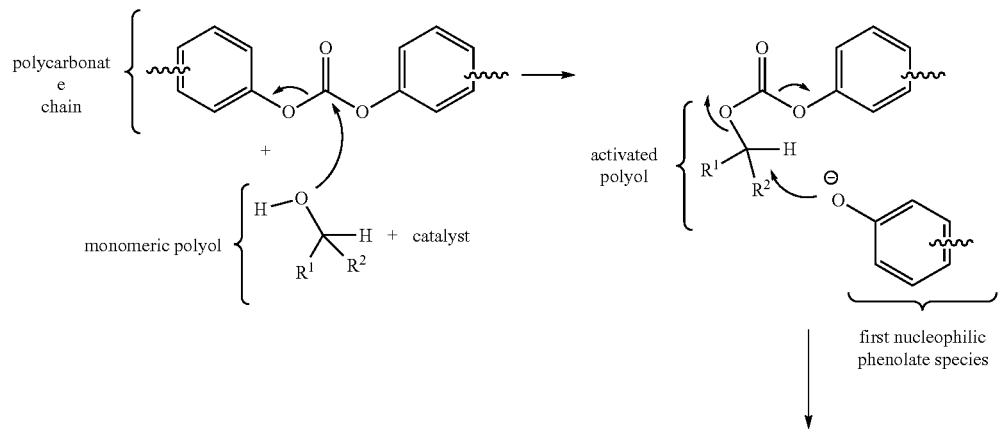

first nucleophilic phenolate species

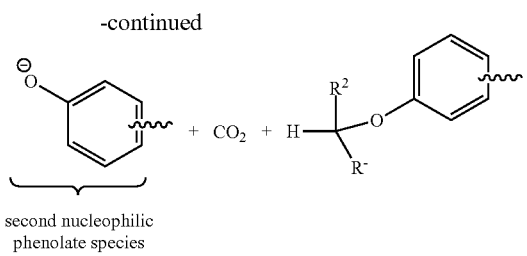

second nucleophilic
phenolate species

Alternatively, the oligomeric polyol may comprise as linking units between the polyol residues and residues of the polyhydroxylated aromatic compound primarily carbonate units, or a mixture of carbonate linking units and ether linking units.

As noted, the polycarbonate employed may be either an oligomeric material or may be a high molecular weight material. In one or more aspects, a polycarbonate containing significant amounts of both high and low molecular weight polycarbonate may be employed in the same reaction mixture in which the oligomeric polyol is formed. The polycarbonate may have a number average molecular weight of about 1000 grams/mole or greater, about 10,000 grams/mole or greater or about 20,000 grams/mole or greater. The polycarbonate may have a number average molecular weight of about 100,000 or less, about 80,000 grams per mole or less, or about 60,000 grams per mole or less.

The polycarbonate may be a copolycarbonate comprising two or more different polyhydroxylated aromatic structural types. Alternatively, the polycarbonate may a homopolymer comprising polyhydroxylated aromatic residues of a single structural type, for example bisphenol A residues. The polycarbonate may comprise endcap groups provided by common chain terminators such as cumyl phenol end groups or phenol end groups. Alternately, the polycarbonate may comprise aromatic hydroxyl end groups only. The polycarbonate may be branched or linear and may be commercial grade polycarbonate or be scrap polycarbonate recovered from a polycarbonate molding operation, to give just one example.

Polycarbonates suitable for use in accordance with one or more aspects of this disclosure may be represented by generic structure VI

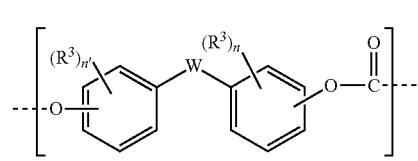

wherein $R^3$ is independently at each occurrence a halogen atom, a nitro group, a $C_1$-$C_{10}$ aliphatic radical, a $C_5$-$C_{10}$ cycloaliphatic radical, or a $C_6$-$C_{20}$ aromatic radical; W is a bond or a linking oxygen atom, a sulfur atom, a sulfur oxide linking group, a $C_1$-$C_{10}$ aliphatic radical, a $C_5$-$C_{10}$ cycloaliphatic radical, or a $C_6$-$C_{20}$ aromatic radical; and the variables n and n' are independently an integer from 0 to 4.

Additionally, R3 is independently at each occurrence a halogen atom, a nitro group, a C1-C5 aliphatic radical, a C5-C10 cycloaliphatic radical, or a C6-C10 aromatic radical; W is a bond or a linking oxygen atom, a sulfur atom, a sulfur oxide linking group, a C1-C5 aliphatic radical, a C5-C10 cycloaliphatic radical, or a C6-C15 aromatic radical; and the variables n and n' are independently an integer from 0 to 4.

Further, R3 is independently at each occurrence a halogen atom, a C1-C2 aliphatic radical, a C5-C8 cycloaliphatic radical, or a C6-C10 aromatic radical; W is a bond or a linking oxygen atom, a sulfur atom, a sulfur oxide linking group, a C1-C3 aliphatic radical, a C5-C9 cycloaliphatic radical, or a C6-C13 aromatic radical; and the variables n and n' are independently an integer from 0 to 2.

Specific examples of suitable bisphenol polycarbonates are given in Table 6.

TABLE 6

| | Illustrative Bisphenol Polycarbonates VI | | | | |
|---|---|---|---|---|---|
| Entry | Structure | $R^3$ | $R^3$ | n' | n |
| VIa | ![structure with W, H3C, CH3, phenyl rings, O and OCO groups] | — | — | 0 | 0 |

TABLE 6-continued
Illustrative Bisphenol Polycarbonates VI
| Entry | Structure | $R^3$ | $R^3$ | n' | n |
|---|---|---|---|---|---|
| VIb | 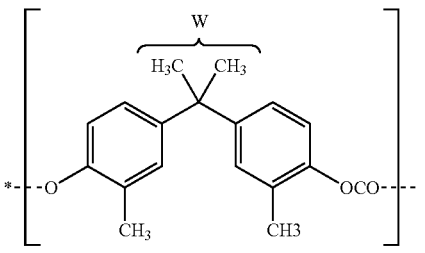 | $CH_3$ | $CH_3$ | 1 | 1 |
| VIc | 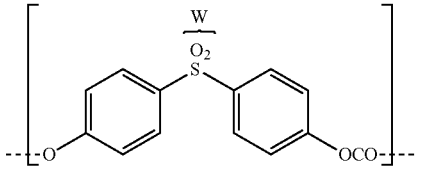 | — | — | 0 | 0 |
| VId | 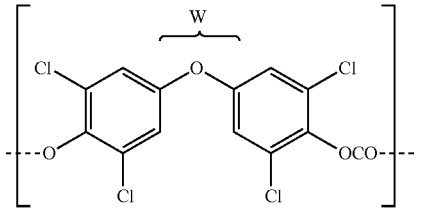 | Cl | Cl | 2 | 2 |
| VIe | 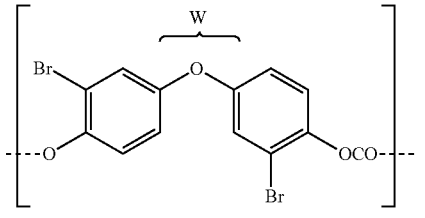 | Br | Br | 1 | 1 |
| VIf | 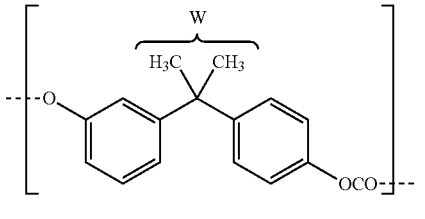 | — | — | 0 | 0 |
| VIg | 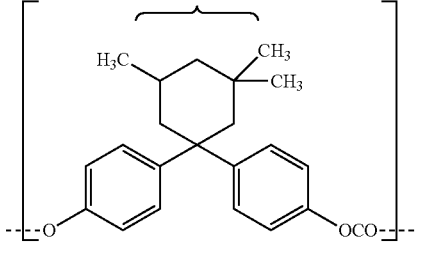 | — | — | 0 | 0 |
| VIh | 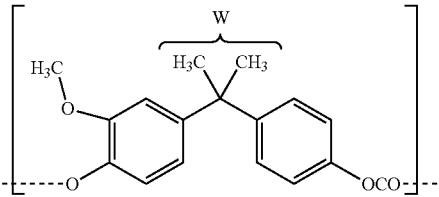 | Et | — | 1 | 0 |

TABLE 6-continued
Illustrative Bisphenol Polycarbonates VI
| Entry | Structure | R³ | R³ | n' | n |
|---|---|---|---|---|---|
| VIi | 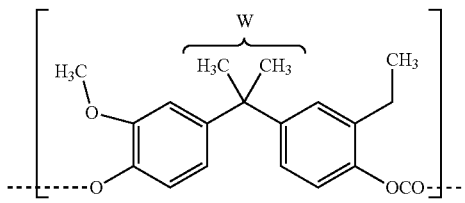 | Et | Et | 1 | 1 |
| VIj | 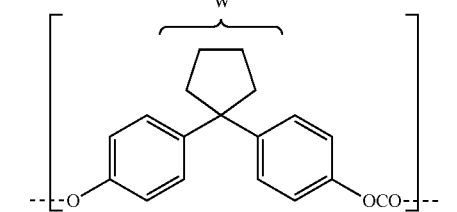 | — | — | 0 | 0 |
| VIk | 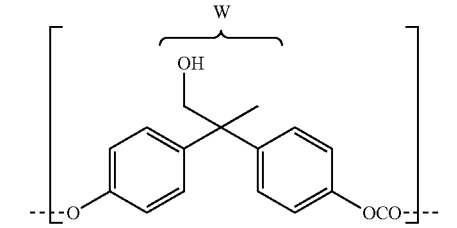 | — | — | 0 | 0 |
| VII | 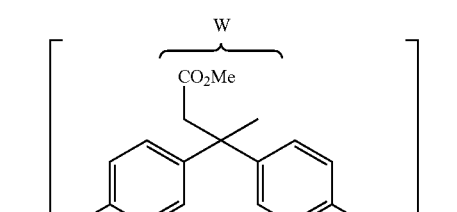 | — | — | 0 | 0 |
| VIm | 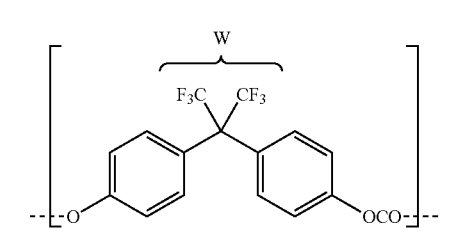 | — | — | 0 | 0 |
| VIn | 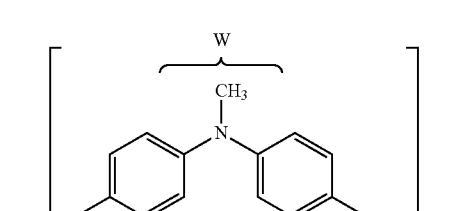 | — | — | 0 | 0 |

TABLE 6-continued
| Illustrative Bisphenol Polycarbonates VI | | | | | |
|---|---|---|---|---|---|
| Entry | Structure | $R^3$ | $R^3$ | n' | n |
| VIo | 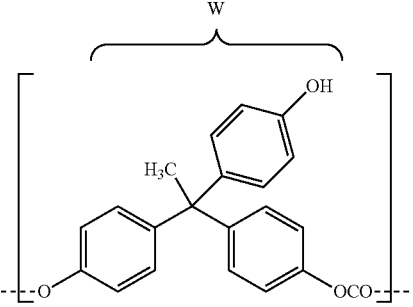 | — | — | 0 | 0 |
| VIp | 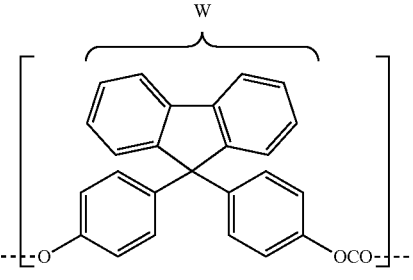 | — | — | 0 | 0 |
| VIq | 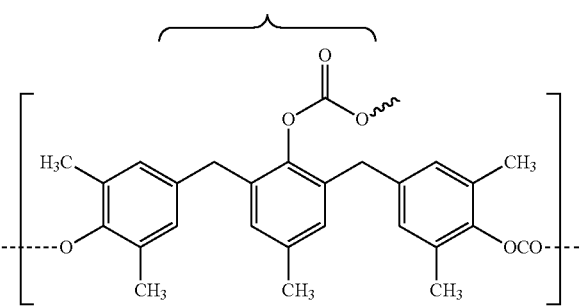 | $CH_3$ | $CH_3$ | 2 | 2 |
| VIr | 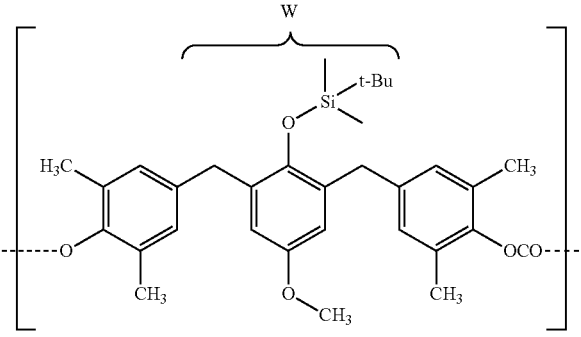 | $CH_3$ | $CH_3$ | 2 | 2 |
| VIs | 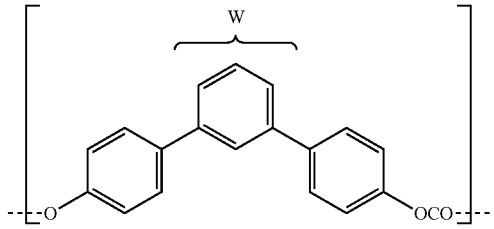 | — | — | 0 | 0 |

TABLE 6-continued

Illustrative Bisphenol Polycarbonates VI

| Entry | Structure | R³ | R³ | n' | n |
|---|---|---|---|---|---|
| VIt | [structure: biphenyl with --O- and OCO- groups, W arrow] | — | — | 0 | 0 |
| VIu | [structure: triaryl methane with H₃C, CO₂CH₃, O and OCO groups, W bracket] | — | — | 0 | 0 |

In addition, copolycarbonates suitable for use according to one or more aspects of the disclosure are illustrated by polycarbonate materials comprising two or more of the structural units shown in illustrative Entries VIa-VIu, for example a copolycarbonate comprising both structural units VIa (bisphenol A polycarbonate) and VIf (m,p-bisphenol A polycarbonate) within the same polymeric material.

Other species which may be used to activate a hydroxyl group of a monomeric polyol toward displacement by a bisphenol phenolate species include monomeric dialkyl carbonates such as dimethyl carbonate and diethyl carbonate, aromatic carbonates such as diphenyl carbonate, aliphatic oxalates such as dimethyl oxalate and diethyl oxalate, aromatic oxalates such as diphenyl oxalate, and phosgene equivalents such as carbonyl diimidazole and hexachloroacetone. When one or more of such other activating agents is employed instead of an oligomeric or polymeric polycarbonate, the monomeric polyol(s) and the bisphenol(s) may be reacted under conditions similar to those described in the Experimental Part of this disclosure, but may advantageously also include an additional step in which either or both of the monomeric polyol and the bisphenol is first reacted with the activating chemical to form ester groups, aliphatic carbonate groups, aromatic carbonate groups, mixed aliphatic and aromatic carbonate groups and/or a mixture two or more of the foregoing carbonate groups. The initial reaction with the activating chemical may be carried out at lower temperature than the subsequent conversion to the oligomeric polyol composition, for instance of about 15° C. or greater, about 25° C. or greater, about 50° C. or greater, or about 75° C. or greater and about 250° C. or less, about 200° C. or less, about 175° C. or less, or about 150° C. or less. Monomeric polyols include polyols disclosed herein.

There is disclosed a method of making an oligomeric polyol composition wherein the activating agent is a component of a polyhydroxylated aromatic moiety, or a bisphenol moiety, or is a component of a polyol moiety; or is a component of either or both of a polyhydroxylated aromatic moiety and a bisphenol moiety, and a polyol moiety; or is present as an independent reactant.

There is disclosed a method of making an oligomeric polyol composition comprising contacting one or more polyhydroxylated aromatic or bisphenol moieties with one or more polyol moieties in the presence of at least one activating agent and an effective amount of at least one of a catalyst, a promoter or a mixture thereof. The contacting is carried out at a temperature sufficient to cause formation of an oligomeric network linked to a plurality of peripheral groups. The oligomeric network comprises residues of at least one polyhydroxylated aromatic compound or bisphenol, and residues of at least one polyol. At least a portion of the peripheral groups comprise a residue of a monomeric polyol and/or a residue of a polyhydroxylated aromatic compound or bisphenol. The product oligomeric polyol composition may be used in a variety of applications, such as polyurethane preparation without a purification step.

There is disclosed a method of making an oligomeric polyol composition in which one or more polyhydroxylated aromatic, diphenol or bisphenol polycarbonates serves both as the source of the polyhydroxylated aromatic, diphenol or bisphenol moieties and as the source of the activating agent. The polyhydroxylated aromatic residues may serve as the source of reactive aromatic hydroxyl and/or phenolate groups, and the carbonate units of the polycarbonate may serve as the activating agent which renders one or more hydroxy groups of the polyol moieties susceptible to aromatic ether formation with polyhydroxylated aromatic moieties. By way of example, a polyhydroxylated aromatic polycarbonate may be heated in the presence of a catalyst together with a polyol comprising at least three hydroxyl groups at a temperature sufficient to cause the formation of mixed carbonate linkages between polyhydroxylated aromatic polycarbonate moieties of lower molecular weight than the polycarbonate used as the initial starting material. The mixed carbonate linkages may lose carbon dioxide and form aromatic ether linkages between a polycarbonate moiety and the residue of the polyol participating in the mixed carbonate linkage. These mixed aromatic carbonate linkages may undergo further exchange with hydroxyl groups of the polyol or residues thereof to form carbonate linkages not including a participating polyhydroxylated aromatic moiety, for example a carbonate linkage between a first polyol a (or a first polyol residue) and a second polyol (or a second polyol residue). As the reaction between the polycarbonate and the polyol continues the concentration of aromatic ether linkages and carbonate linkages not including a participating polyhydroxylated aromatic moiety increases as molecular weight of the remaining polycarbonate moieties decreases. Those of ordinary skill in the art will understand that when a sufficient quantity of the polyol is used, essentially all of the carbonate linkages in polycarbonate with be converted into carbon dioxide or be converted into mixed carbonates, or carbonates between one or more polyol residues. The product oligomeric polyol composition may comprise a statistical mixture of products resulting from chain scission of the polycarbonate starting material and include a substantial amount of free polyhydroxylated aromatic monomer and/or polycarbonate oligomers as well as unconsumed monomeric polyol and catalyst.

There is disclosed a method of making an oligomeric polyol composition as just described but substituting a promotor for the catalyst. For example, one or more monomeric polyhydroxylated amines comprising one or more tertiary amines may serve as the promoter. Monomeric polyhydroxylated amines comprising one or more tertiary amines are illustrated by monomeric polyols Vf-Vm and Vu disclosed in Table 5 herein. While the tertiary amine groups may survive the formation of the oligomeric polyol composition, the monomeric polyhydroxylated amine may be incorporated via its hydroxy groups into the oligomeric polyol and consumed as a result. It is noteworthy that oligomeric polyols comprising residues of polyhydroxylated amines comprising tertiary amine groups may serve as amine catalysts.

The process for making the oligomeric polyols may be performed at a temperature at which the oligomeric polyol is formed. The process for making the oligomeric polyols may be performed at a temperature of about 80° C. or greater, about 120° C. or greater or about 160° C. or greater. The process for making the oligomeric polyols may be performed at a temperature of about 220° C. or less, about 180° C. or less or about 160° C. or less. The process for making the oligomeric polyols may be performed for a sufficient time to form the oligomeric polyols. Such reaction times may about 10 minutes or greater, about 45 minutes or greater or about 90 minutes or greater. Such reaction times may be about 180 minutes or less, about 130 minutes or less or about 90 minutes or less. The molar ratio of the polyhydroxylated aromatic compounds to polyols is chosen such that physical and chemical properties of the oligomeric polyol may be tuned as needed. For example, the crosslink density within the oligomeric polyol may be varied by varying the ratio of polyhydroxylated aromatic compounds to polyols. The molar ratio of the polyhydroxylated aromatic compounds to polyols may be about 3:1 or less, about 1.5:1 or less or about 1:1 or less. The molar ratio of the polyhydroxylated aromatic compounds to polyols may be about 0.25:1 or greater, about 0.6:1 or greater or about 1:1 or greater. Where a catalyst is present, any catalyst that is effective in causing the formation of the oligomeric network may be used. The catalyst may be present in an amount based on the weight of the reaction mixture of about 1 percent by weight or greater, about 5 percent by weight or greater, or about 9 percent by weight or greater. The catalyst may be present in an amount based on the weight of the reaction mixture of about 25 percent by weight or less, about 15 percent by weight or less, or about 9 percent by weight or less. Where a promoter is present, any promoter that is effective in causing the formation of the oligomeric network may be used. The promoter may act to solubilize and/or compatibilize reactants used to create the oligomeric polyol and enhance reaction rates of chemical transformations that result in the formation of the oligomeric polyol. The promoter may be present in an amount based on the weight of the reaction mixture of about 1 percent by weight or greater, about 5 percent by weight or greater, or about 9 percent by weight or greater. The promoter may be present in an amount based on the weight of the reaction mixture of about 25 percent by weight or less, about 15 percent by weight or less, or about 9 percent by weight or less. The process may be performed wherein the polyol is at least one polyhydroxylated amine having a tertiary amine. The tertiary amine can function as a catalyst and/or promoter. Where the process is performed wherein the polyol is at least one polyhydroxylated amine having a tertiary amine group the polyhydroxylated amine having a tertiary amine group may be present in an amount of about 1 percent by weight or greater, about 5 percent by weight or greater or about 9 percent by weight or greater based on the total weight of the reactants used to form the oligomeric polyol. Where the process is performed wherein the polyol is at least one polyhydroxylated amine having a tertiary amine group, the polyhydroxylated amine having a tertiary amine group may be present in an amount of about 30 percent by weight or less, about 20 percent by weight or less or about 9 percent by weight or less based on the total weight of the reactants used to form the oligomeric polyol.

The oligomeric polyol may be prepared using at least two polyols one containing no amines and one containing a tertiary amine wherein the polyol containing a tertiary amine can function as the catalyst and/or promoter. For this process the ratio of polyol to polyol containing a tertiary amine can be any ratio that results in formation of the desired oligomeric polyol. The molar ratio of the polyol without an amine to polyols containing a tertiary amine may be about 2:1 or greater, about 4:1 or greater or about 10:1 or greater. The molar ratio of the polyol without an amine to polyols containing a tertiary amine may be about 25:1 or less, about 15:1 or less or about 10:1 or less.

There are disclosed oligomeric polyol compositions which are liquids at twenty-five degrees centigrade, thirty-five degrees centigrade, fifty degrees centigrade, or seventy-five degrees centigrade, and having a viscosity at 150 degrees Fahrenheit in a range from about 1000 cps, to about 20000 cps, or about 40,000 cps.

There are disclosed oligomeric polyol compositions useful in the preparation of novel polyurethane materials having excellent physical properties. The polyurethane materials and articles containing them may be prepared using the techniques disclosed herein as well as art-recognized polyurethane polymer preparation and processing techniques such as those disclosed in E. N. Doyle's The Development and Use of Polyurethane Products (McGraw-Hill, Inc. 1971), Saunders' et al. Polyurethanes Chemistry and Technology, Parts I-II (Interscience Publishers), Saunders' Organic Polymer Chemistry (Chapman and Hall), J. M. Burst's Developments in Polyurethanes (Applied Science Publishers) and the Kirk Othmer Encyclopedia of Chemical Technology which are incorporated herein by reference in their entirety for all purposes.

When reacted with one or more polyisocyanates or polyisocyanate equivalents the oligomeric polyol compositions are converted into polyurethanes with superior strength, hardness and moldability when compared to analogous polyurethanes not incorporating such oligomeric polyol compositions. In addition, polyurethane-forming formulations comprising one or more of oligomeric polyol compositions disclosed herein exhibit less intense reaction exotherms during curing than do analogous polyurethane-forming formulations lacking such oligomeric polyol compositions. Polyurethanes prepared from the oligomeric polyols disclosed herein exhibit excellent shrinkage resistance.

The oligomeric polyol compositions disclosed herein can be employed as in an easy to use A plus B polyurethane-forming formulation; component A comprising one or more polyisocyanates or polyisocyanate equivalents and component B comprising the oligomeric polyol composition. Component B may be a mixture of one or more of the oligomeric polyol compositions disclosed herein and may contain one or more art recognized components such as polyurethane catalysts, mold release agents, additional polyols, to name a few such art recognized components. Component A may contain a polyisocyanate prepolymer and/or one or more polyisocyanates, or component A may comprise one or more polyisocyanate prepolymers and be essentially free of polyisocyanates. Such A plus B polymer systems provide a useful alternative to unsaturated polyester systems used in SMC, BMC and RTM molding, and epoxy systems used in casting and RTM. Because the oligomeric polyol compositions typically have a relatively low viscosity under normal processing temperatures, they may be combined with one or more polyisocyanates and/or polyisocyanate prepolymers and injected at low pressure and moderate temperatures eliminating the need for expensive hydraulic presses and steel tooling such as are used in thermoplastic injection molding, BMC and SMC. Low cost aluminum tooling or even gel-coat FRP tooling may be used advantageously due to the low injection pressure needed to fill the mold and the relatively low exotherm observed when the oligomeric polyols are reacted with polyisocyanates. As will be appreciated by those of ordinary skill in the art, significant advantages may attend the use of low cost tooling and processing equipment. Ease of processing during molding for example, will enhance the attractiveness of polyurethanes comprising structural units derived from oligomeric polyols relative to harder to process thermoplastics.

Polyurethane-forming formulations comprising the oligomeric polyol compositions disclosed herein may be processed into molded polyurethane containing parts using one or more of Reaction Injection Molding (RIM), Compression Molding, Resin Transfer Molding, Poured Open Molding and Sprayed Open Molding to name a few.

In one aspect, the oligomeric polyols disclosed herein may be incorporated into polyurethane elastomer precursor formulations which provide for rapid set up times to product polyurethanes having Young's moduli below 50,000 psi while having excellent mold release characteristics.

There is disclosed an oligomeric polyol composition which may be reacted with a polyisocyanate or residue thereof having structure VII

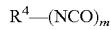

$$R^4\text{---}(NCO)_m \qquad \qquad VII$$

wherein $R^4$ is a hydrocarbyl group and m is an integer, to form useful polyurethane materials.

The isocyanate functional components can be in the form of isocyanate functional prepolymers, monomers or oligomers having on average greater than 1 isocyanate group, and preferably 2 or more isocyanate groups. The isocyanate prepolymers can by any prepolymers prepared by reaction of an isocyanate functional compound with one or more compounds having on average more than one isocyanate reactive functional groups, such as hydroxyl, amine, thiol, carboxyl and the like, under conditions such that the prepolymers prepared have on average more than one isocyanate moiety (group) per molecule. The isocyanate functional components are present in the curable composition in a sufficient amount to form a cured component when exposed to curing conditions. The isocyanate functional component is present in the curable composition in a sufficient amount to form a cured component when exposed to curing conditions. Exemplary polyisocyanates useful in the invention and in preparing isocyanate functional prepolymers include any aliphatic, cycloaliphatic, araliphatic, heterocyclic or aromatic polyisocyanates, or mixtures thereof. The polyisocyanates used may have an average isocyanate functionality of about 2.0 or greater and an equivalent weight of about 80 or greater. The isocyanate functionality of the polyisocyanates may be about 2.0 or greater, about 2.2 or greater, or about 2.4 or greater; and may be about 4.0 or less, about 3.5 or less, or about 3.0 or less. Higher functionality may be used, but may cause excessive cross-linking and result in a composition which is too viscous to handle and apply easily and can cause the cured composition to be too brittle. The equivalent weight of the polyisocyanates may be about 80 or greater, about 110 or greater, or about 120 or greater; and may be about 300 or less, about 250 or less, or about 200 or less. Exemplary aliphatic polyisocyanates include those disclosed by Wu, U.S. Pat. No. 6,512,033 at column 3, line 3 to line 49, incorporated herein by reference. Exemplary aliphatic isocyanates include, isophorone diisocyanate, tetramethylxylene diisocyanate, 1,6-hexa-methylene diisocyanate and oligomeric or polymeric derivatives thereof, bis(4-isocyanato-cyiohexyl)methane, and trimethyl hexamethylene diisocyanate. The aliphatic isocyanates may be hexamethylene diisocyanate and oligomeric and polymeric derivatives thereof. Examples of aliphatic isocyanates include trimers of hexamethylene diisocyanate, such as those available from Bayer under the trademark and designation DESMODUR N3300, DESMODUR N3400, DESMODUR N-100. Exemplary aromatic polyisocyanates may include those disclosed by Wu, U.S. Pat. No. 6,512,033 at column 3, line 3 to line 49, incorporated herein by reference. Aromatic isocyanates may include diphenylmethane diisocyanate, toluene diisocyanate and polymeric derivatives thereof. One isocyanate is diphenylmethane diisocyanate. Oligomeric aromatic polyisocyanates useful include those available from The Dow Chemical Company under the trademarks PAPI and VORANATE, such as VORANTE M220, PAPI 27 and PAPI 20 polymeric isocyanates. Suitable polyols useful in the preparation of the prepolymers include, for example, polyether polyols, polyester polyols, polyalkylene carbonate)polyols, hydroxyl-containing polythioethers, polymer polyols, and mixtures thereof. Polyether polyols are well-known in the art and include, for example, polyoxyethylene, polyoxypropylene, polyoxybutylene, and polytetramethylene ether diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945; 4,218, 543; and 4,374,210; which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerin with propylene oxide, followed by reacting with ethylene oxide.

There is disclosed an oligomeric polyol composition which may be reacted with a polyisocyanate or residue thereof having structure VII $$R^4(NCO)_m \qquad \text{VII}$$

wherein $R^4$ is a $C_2$-$C_{30}$ aliphatic radical, a $C_5$-$C_{20}$ cycloaliphatic radical, or a $C_6$-$C_{30}$ aromatic radical and m is an integer from 2 to 6, to provide a polyurethane material.

Additionally, R4 is a C2-C25 aliphatic radical, a C5-C15 cycloaliphatic radical, or a C6-C25 aromatic radical and m is an integer 2 or greater and 4 or less, or 3 or less.

Further, R4 is a C2-C17 aliphatic radical, a C5-C13 cycloaliphatic radical, or a C6-C22 aromatic radical and m is an integer 2 or greater and 3 or less.

Specific examples of polyisocyanates having structure VII and suitable for incorporation into polyurethanes are given in Table 7 and include aliphatic polyisocyanates VIIa-VIIe, cycloaliphatic polyisocyanates VIIf-VIIk, and aromatic polyisocyanates VII-VIIp.

TABLE 7

| Entry | Structure | $R^4$ | m |
|---|---|---|---|
| VIIa | 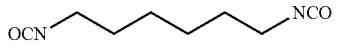 | $(CH_2)_6$ | 2 |
| VIIb | 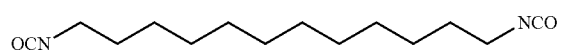 | $(CH_2)_{10}$ | 2 |
| VIIc | 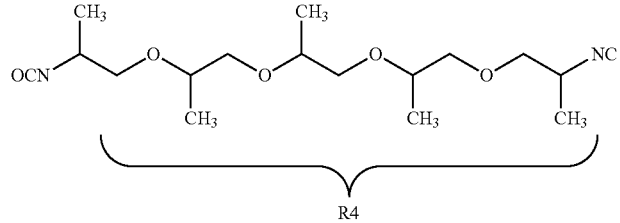 | See Structure | 2 |
| VIId | 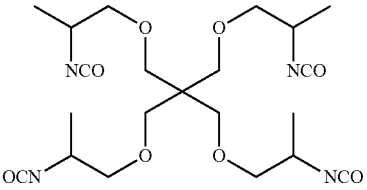 | See Structure | 4 |
| VIIe | 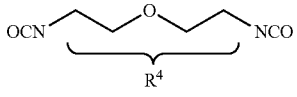 | See Structure | 2 |
| VIIf | 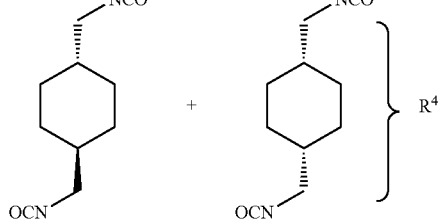 | See Structure | 2 |
| VIIg | 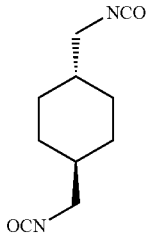 (trans only) | See Structure | 2 |

TABLE 7-continued
Illustrative Polyisocyanates VII
| Entry | Structure | R⁴ | m |
|---|---|---|---|
| VIIh | 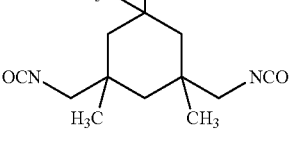 | See Structure | 3 |
| VIIi | 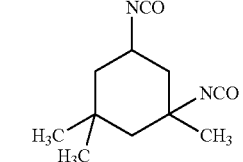 | See Structure | 2 |
| VIIj | 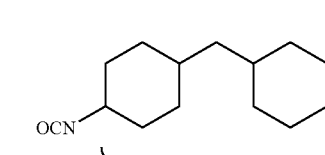 | See Structure | 2 |
| VIIk | 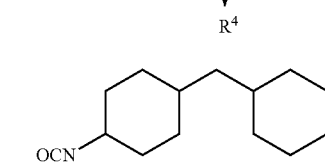 | See Structure | 2 |
| VIII | 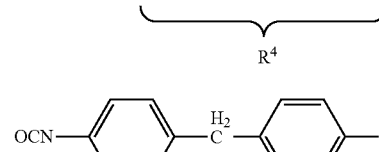 (MDI) | See Structure | 2 |
| VIIm | 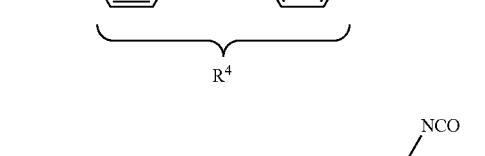 Vm (2,4-TDI) (2,6-TDI) | See Structure | 2 |
| VIIn | 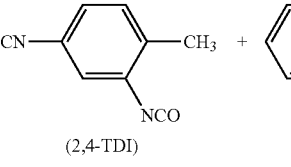 (2,4-TDI substantially free of 2,6-TDI) | See Structure | 2 |
| VIIo | 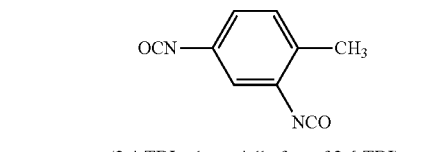 | See Structure | 3 |

TABLE 7-continued

Illustrative Polyisocyanates VII

| Entry | Structure | R⁴ | m |
|---|---|---|---|
| VIIp | (structure shown) | See Structure | 3 |

There is disclosed a polyurethane material which may obtained by mixing one or more polyisocyanates, for example polyisocyanates VIII (MDI) and VIIn (TDI), or a prepolymer, or a latent form thereof such as a blocked derivative, with the oligomeric polyol composition as the crude reaction product in which it is formed, for example a crude reaction product obtained by contacting bisphenol A polycarbonate powder (100 grams) with a mixture of polyols Va (100 grans) and Vf (20 grams) at a temperature in a range from about 150 degrees centigrade to about 180 degrees centigrade for a period of one to three hours to provide a product mixture comprising an oligomeric polyol component comprising peripheral groups Ic and If bound to an oligomeric network comprising structural units derived from bisphenol A polycarbonate and polyols Va and Vf. The polyisocyanates may be mixed with the oligomeric polyol composition in amounts such that there is a slight excess of hydroxyl groups relative to isocyanate groups, thus assuring complete consumption of isocyanates VIII and VIIn as the oligomeric polyol composition is converted into a polyurethane. In the example just given, the oligomeric polyol composition as produced may contain unbound monomeric polyols Va and Vf as well as free bisphenol A. The complexity of the oligomeric polyol composition notwithstanding, such compositions can be converted to useful polyurethane products without an intervening purification step. It may be useful to subject the oligomeric polyol composition to a purification step prior to its conversion to a polyurethane. Suitable purification steps may include filtration, recrystallization, zone refining and trituration, for example.

Disclosed is a composition comprising; in one part a) a polyisocyanate; and b) in a second part an oligomeric polyol as claimed herein; wherein when the first part and the second part are contacted and the composition cures.

In preparing the cured polyurethanes one or more second polyols may be present. For example, the second polyol may be one or more of a polyalkylene oxide ether based polyol, a polyester polyol, a polyacrylate polyol or a polycarbonate polyol. Exemplary classes of polyols include polyether polyols, polyarylene ether polyols, polyester polyols, poly(alkylene carbonate)polyols, hydroxyl containing polythioethers and mixtures thereof. Polyether polyols may contain one or more alkylene oxide units in the backbone of the polyol. Exemplary alkylene oxide units are ethylene oxide, propylene oxide, butylene oxide and mixtures thereof. The alkylene oxides may contain straight or branched chain alkylene units. The polyol may contain propylene oxide units, ethylene oxide units or a mixture thereof. Where a mixture of alkylene oxide units is contained in a polyol, the different units can be randomly arranged or arranged in blocks of each alkylene oxide. The polyol may comprise propylene oxide chains with ethylene oxide chains capping the polyol. The polyols may be a mixture of diols and triols.

The individual polyols may have a functionality of about 1.9 or greater, about 1.95 or greater, or about 2.0 or greater; and may have a functionality of about 6.0 or less, about 4.0 or less, about 3.5 or less, or about 3.0 or less. The equivalent weight of the second polyols may be about 200 or greater, about 500 or greater, or about 1,000 or greater; and may be about 5,000 or less, about 3,000 or less, or about 2,500 or less. The second polyols may be located in the second part of a curable polyurethane composition. The second polyols may be present in the composition in an amount of about 2 percent by weight or greater, about 10 percent by weight or greater or about 20 percent by weight or greater based on either the total weight of the oligomeric polyol composition, the total weight of a curable composition comprising in one part a) a polyisocyanate; and b) in a second part an oligomeric polyol, or the weight of either the polyisocyanate component or the oligomeric polyol component of the curable composition. The second polyol may be present in the composition in an amount of about 35 percent by weight or less, about 15 percent by weight or less or about 5 percent by weight or less based on either the total weight of the oligomeric polyol composition, the total weight of a curable composition comprising in one part a) a polyisocyanate; and b) in a second part an oligomeric polyol, or the weight of either the polyisocyanate component or the oligomeric polyol component of the curable composition.

The curable compositions may further comprise one or more low molecular weight compounds having two or more isocyanate reactive groups and a hydrocarbon backbone wherein the backbone may further comprise one or more heteroatoms. Such low molecular weight compounds may be chain extenders, such compounds are difunctional, or crosslinkers, having greater than two active hydrogen groups per compound. The heteroatoms in the backbone may be oxygen, sulfur, nitrogen or a mixture thereof, oxygen, nitrogen or a mixture thereof, or oxygen which is most preferred. The molecular weight of the low molecular weight compound may be about 120 or less or about 100 or less. The low molecular weight compound may comprise one or more multifunctional alcohols, multifunctional alkanol amines, one or more adducts of multifunctional alcohol and an alkylene oxide, one or more adducts of a multifunctional alkanol amine and an alkylene oxide or a mixture thereof. Exemplary multifunctional alcohols and multifunctional alkanol amines are ethane diol, propane diol, butane diol, hexane diol, heptane diol, octane diol, glycerin, trimethylol propane, pentaerythritol, neopentyl glycol, ethanol amines (diethanol amine, triethanol amine) and propanol amines (di-isopropanol amine, tri-isopropanol amine) and the like. Blends of various low molecular weight compounds may be used. The low molecular compound may be located in the second part. The low molecular weight compound may be present in the composition in an amount of about 2 percent by weight or greater, about 3 percent by weight or greater or about 4.0 percent by weight or greater. The low molecular weight compound is present in the composition in an amount of about 16 percent by weight or less, about 12 percent by weight or less or about 10 percent by weight or less.

The second part may comprise a catalyst for the reaction of hydroxyl groups with isocyanate groups. Among exemplary catalysts are organotin compounds, metal alkanoates, and tertiary amines. Mixtures of classes of catalysts may be used, such as a mixture of a tertiary amine and one or more of organotin compounds or metal alkanoates. Such a mixture may include tertiary amines, such as dimorpholino diethyl ether, and a metal alkanoate, such as bismuth octoate. Included in organotin compounds are alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. Exemplary organotin compounds are dialkyltin dicarboxylates and dialkyltin dimercaptides. Dialkyl tin dicarboxylates with lower total carbon atoms are preferred as they are more active catalysts in the compositions. Exemplary dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organo tin compounds or metal alkanoates may be present in an amount of about 60 parts per million or greater based on the weight of the composition, about 120 parts by million or greater. The organo tin compounds or metal alkanoates may be present in an amount of about 1.0 percent or less based on the weight of the composition, about 0.5 percent by weight or less or about 0.2 percent by weight or less. Exemplary tertiary amine catalysts include dimorpholinodialkyl ether, a di((dialkyl-morpholino)alkyl)ether, bis-(2-dimethylaminoethyl)ether, triethylene diamine, pentamethyldi-ethylene triamine, N,N-dimethylcyclohexylamine, N,N-dimethyl piperazine, 4-methoxyethyl morpholine, N-methylmorpholine, N-ethyl morpholine, diazabicyclo compounds and mixtures thereof. An exemplary dimorpholinodialkyl ether is dimorpholinodiethyl ether. An exemplary di((dialkylmorpholino)alkyl)ether is (di-(2-(3,5-dimethylmorpholino)ethyl)-ether). Diazabicyclo compounds are compounds which have diazobicyclo structures. Exemplary diazabicyclo compounds include diazabicycloalkanes and diazabicyclo alkene salts. Exemplary diazabicycloalkanes include diazabicyclooctane, available from Air Products under the trademark and designations, DABCO, DABCO WT, DABCO DC 1, DABCO DC 2, and DABCO DC 21. Diazabicycloalkene salts include diazabicycloundecene in the phenolate, ethylhexoate, oleate and formiate salt forms, available from Air Products under the trademark and designations, POLYCAT SA 1, POLYCAT SA 1/10, POLYCAT SA 102 and POLYCAT SA 610. Tertiary amines may be employed in an amount, based on the weight of the composition of about 0.01 percent by weight or greater, about 0.05 percent by weight or greater, about 0.1 percent by weight or greater or about 0.2 percent by weight or greater and about 2.0 percent by weight or less about 1.5 percent by weight or less, or about 1.2 percent by weight or less.

One or both of parts may contain a filler. Fillers are added for a variety of reasons and one or more types of fillers may be utilized in the composition. Fillers may be added to reinforce the composition, to impart the appropriate viscosity and rheology and to strike a balance between cost and the desired properties of the composition and the parts of the composition. Reinforcing fillers, such as one or more carbon blacks, one or more clays or non-pigmented fillers, one or more thixotropes or combinations thereof may be used. Such fillers are used in a sufficient amount to impart an acceptable balance of viscosity and cost to the formulation and to achieve the desired properties of the composition. Among fillers useful for this purpose are clays, untreated and treated talc, and calcium carbonates. Preferred clays useful in the invention include kaolin, surface treated kaolin, calcined kaolin, aluminum silicates and surface treated anhydrous aluminum silicates. Kaolin is also known as Kaolinite and comprises compounds represented by the chemical formula $Al_2Si_2O_5(OH)_4$, and it most often occurs as clay-sized, plate like, hexagonally shaped crystals. The clays can be used in any form which facilitates formulation of a composition having the desired properties. The composition may further comprise fillers which function as a thixotrope (rheological additive). Such thixotropes are well known to those skilled in the art and include fumed silica and the like. Preferred fumed silicas include organically modified fumed silicas. The thixotrope may be added to the composition in a sufficient amount to give the desired rheological properties. Additional suitable fillers include glass flake, glass fibers carbon fiber and basalt fiber.

The compositions may further comprise a plasticizer commonly used in polyurethane compositions. The composition may contain plasticizers in both components. Exemplary plasticizers include straight and branched alkylphthalates, such as diisononyl phthalate, dioctyl phthalate and dibutyl phthalate, a partially hydrogenated terpene commercially available as "HB-40", trioctyl phosphate, alkylsulfonic acid esters of phenol, toluene-sulfamide, adipic acid esters, castor oil, xylene, 1-methyl-2-pyrrolidinone and toluene. Exemplary plasticizers are branched plasticizers, such as branched chain alkyl phthalates for example di-isononyl phthalates (available under the Trademark PLATINOL N from BASF. The amount of plasticizer used is that amount sufficient to give the desired rheological properties and disperse the components in the curable composition. The plasticizer is present in about 1 percent by weight or greater of the composition, about 5 percent by weight or greater, or about 10 percent by weight or greater. The plasticizer may be present in about 50 percent by weight or less of the composition or about 40 percent by weight or less.

Other components commonly used in curable compositions may be used in the compositions. Such materials are well known to those skilled in the art and may include ultraviolet stabilizers and antioxidants and the like.

Experimental Part

Examples describing the preparation of oligomeric polyol compositions and their conversion into polyurethane materials are presented. Structures for representative polyols comprising at least three hydroxyl groups and polyhydroxylated amines are presented in Table 5 and the structures of polyols Va and Vf are reproduced below.

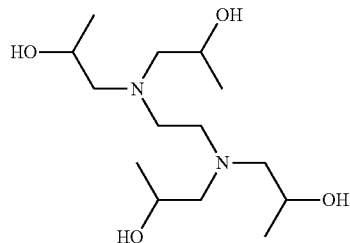

Multranol 9181
Formula Weight: 292.41488

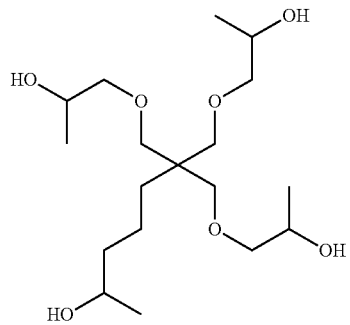

Pluracol 450
Formula Weight: 368.46294

Example 1 Preparation of Oligomeric Polyol Composition

A 10-liter reaction vessel equipped with an overhead stirrer, thermometer/thermocouple port and optionally a nitrogen inlet was charged with 100 parts of propoxylated pentaerythritol (PEP 450) and 20 parts of Multranol 9181. The flask and contents were heated to 150° C. and polycarbonate powder, 100 parts was added portion-wise over a period of about 2 hours. When addition of the polycarbonate was complete the mixture was stirred at about 150° C. until gas evolution ceased (approximately 1 hour). The molten mixture solidified to a glassy brown solid on cooling.

Analysis of this product oligomeric polyol composition using gel permeation chromatography with UV detection indicated that significant chain scission of the polycarbonate had occurred. The gel permeation chromatogram exhibited a broad, bimodal peak in the 3,000 to 5000 MW range and a relatively sharp peak indicative of free bisphenol A. The FTIR spectrum of the product exhibited no absorption at 1770 cm-1 indicative of the aromatic carbonate linkage. Instead, a medium absorbance at 1750 cm-1 was observed corresponding to aliphatic ester and/or carbonate groups. The oligomeric polyol composition was shown to contain both aromatic and aliphatic hydroxyl groups. The product oligomeric polyol composition flowed freely when warmed (See Table 9) and did not appear to be highly crosslinked. The level of branching present in the oligomeric polyol could not be determined with precision owing to the complexity of the proton and carbon NMR spectra in the portions of the spectrum of interest. Polyurethane compositions comprising the reaction product of the oligomeric polyol composition with a polyisocyanate exhibited DSC/DMA behavior consistent a single phase polyurethane.

Examples 2-5

Following a procedure analogous to that described in Example 1 but varying the relative amounts of each of the components afforded similarly constituted oligomeric polyol compositions. These compositions are described in Table 8. It is to be noted that when lower amounts of the tertiary amine are employed (examples 3 and 4) the infrared spectrum exhibited a carbonyl absorption at 1770 cm-1 indicating that at least some aromatic carbonate groups were present in the product oligomeric polyol composition.

TABLE 8

Oligomeric Polyol Compositions - Examples 2-5

| Example | PEP 450 (parts) | BPA-PC (parts) | Multranol 9181 (parts) | FTIR vC = O cm−1 |
|---|---|---|---|---|
| 2 | 200 | 100 | 20 | 1750 |
| 3 | 100 | 100 | 10 | 1770 (weak) |
| 4 | 200 | 100 | 10 | 1770 (weak) |
| 5 | 0 | 100 | 100 | 1727 |

Example 6 Polyurethane Based on Oligomeric Polyol Composition

A polyurethane composition was made using as Component "B" of a two-part A+B formulation an oligomeric polyol composition made by combining 600 grams of a tetra functional amine based monomeric polyol, Multranol 9181 (Covestro), with 3000 grams of tetra functional polyether polyol, Pluracol 450 (BASF), and 3000 grams of 30,000 molecular weight Bisphenol A polycarbonate, Lexan 105 (Sable) in the manner described in Example 1 above. Multranol 9181 contains tertiary amine groups and is substantially free of primary and secondary amine groups. Pluracol 450 is substantially free of amine groups. Each of Multranol 9181 and Pluracol 450 contains four hydroxyl groups per molecule. This product oligomeric polyol composition may be referred to herein as PEP450/9181/PC105 and had the viscosity/temperature characteristics given in Table 9.

TABLE 9

Viscosity Profile of PEP450/9181/PC105 Oligomeric Polyol Composition

| Viscosity | Temp Deg F. | Viscosity CPS |
|---|---|---|
| | 130 | 23520 |
| | 140 | 11980 |
| | 150 | 7128 |
| | 160 | 4404 |
| | 170 | 3044 |
| | 180 | 2164 |
| | 190 | 1515 |
| | 200 | 1116 |

The oligomeric polyol composition (Component B, "B-Side") was mixed with an isocyanate (Component A, "A Side) consisting of a modified polymeric diphenylmethane diisocyanate (MDI) Baydur 486 (Covestro), in a stoichiometric equivalent amount using a cast elastomer dispensing machine equipped with a dynamic mixhead. The pumping conditions were as follows:

| Pumping Conditions | Ratio | Temperature Deg F. |
|---|---|---|
| A-Side Baydur 486 | 42.8% | 150 |
| B-Side PEP450/9181/PC105 | 57.2% | 190 |

The resulting mixture was open poured into a 12 inch by 12 inch by ⅜-inch mold heated to 150 F and allowed to cure. The resulting gel time was 45 seconds and the peak exotherm was 230 F. The finished plaque was machined to suitable test specimens according to ASTM D790 and tested for flexural strength and modulus. The resulting values were:

| Flex Strength (psi) | 17,780 | ASTM D790 |
|---|---|---|
| Flex Modulus (psi) | 465,120 | ASTM D790 |

In addition to the plaque sample a test part was made by open pouring the mixture into a silicone rubber mold. The part was easily removed from the mold and had excellent surface appearance and mold replication as shown in FIG. 1.

Comparative Example 1 Polyurethane without Oligomeric Polyol Composition

A polyurethane composition was made using as the "B" side a mixture of 600 grams of Multranol 9181 and 3000 grams of Pluracol 450 without any added polycarbonate. This Multranol 9181/Pluracol 450 mixture had the viscosity/temperature characteristics given in Table 10.

TABLE 10

Viscosity Profile of PEP 450 - Multranol 9181 Mixture

| Viscosity Temp Deg F. | Viscosity CPS |
|---|---|
| 100 | 633 |
| 110 | 442 |
| 120 | 307 |
| 130 | 193 |
| 140 | 129 |
| 150 | 89 |
| 160 | 61 |
| 170 | 44 |
| 180 | 30 |
| 190 | 22 |

The mixture of Multranol 9181 and PEP 450 was used as the "B" component of an A+B polyurethane formulation. The Multranol 9181-PEP 450 B component was mixed with an isocyanate "A-Side" component consisting of a modified polymeric diphenylmethane diisocyanate (MDI) (Baydur 486 from Covestro) in a stochiometric equivalent amount using a cast elastomer dispensing machine equipped with a dynamic mixhead. The pumping conditions were as follows:

| Pumping Conditions | Volumetric Ratio | Temperature F. |
|---|---|---|
| A-Side Baydur 486 | 58.3% | 150 |
| B-Side PEP450/9181 | 41.7% | 160 |

The resulting mixture was open poured into a 12 inch by 12 inch by ⅜-inch mold as in Example 11 and cured. The gel time observed was 20 seconds and a peak exotherm was 265 F. The finished plaque was machined to suitable test specimens according to ASTM D790 and tested for flexural strength and modulus. The resulting values were:

| Flex Strength (psi) | 20,506 | ASTM D790 |
|---|---|---|
| Flex Modulus (psi) | 361,244 | ASTM D790 |

Figure 2:
FIG. 2 is a photograph of a molded polyurethane article comprising components PEP450/9181 but not containing oligomeric polyol composition PEP450/9181/PC105.

In addition to the plaque sample, a test part was made by open pouring the mixture into a silicone rubber mold. The part was difficult to remove from the mold and had rough and irregular surface appearance and poor mold replication as shown in FIG. 2.

Figure 3:
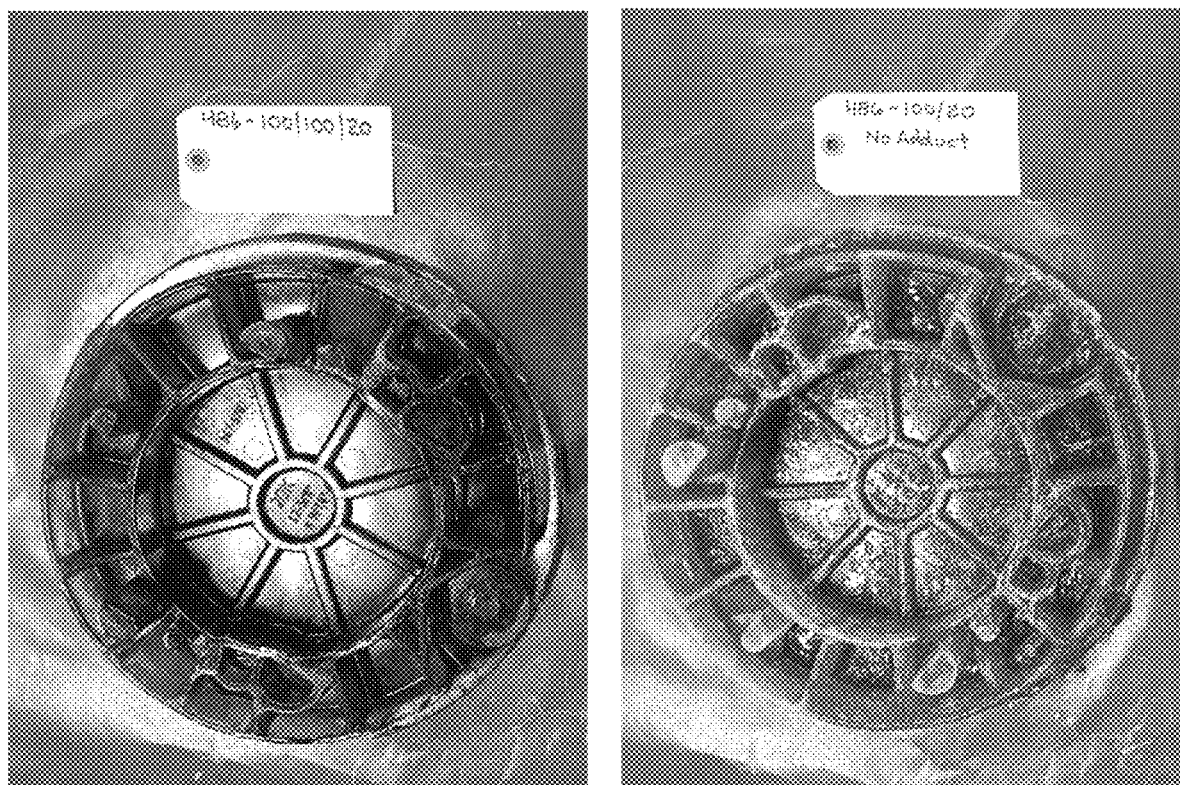
FIG. 3 is a side by side comparison of the molded polyurethane articles of FIG. 1 and FIG. 2.

Data obtained for the polyurethane of Example 6 and the polyurethane of Comparative Example 1 are assembled below and in FIG. 3 for convenience of comparison. The use of the oligomeric polyol composition resulted in lower exotherm and higher flexural modulus. The lower exotherm can allow the use of lower cost fiber reinforced gel coat tooling and the higher stiffness can meet the needs of more demanding structural applications. The addition of the oligomeric polyol composition also resulted in a significant improvement in the part appearance and in the mold replication fidelity.

| Polyurethane Composition | Gel Time | Exotherm | Flex Strength | Flex Modulus |
|---|---|---|---|---|
| 486/9181/PEP450/PC | 45 sec. | 230 F. | 17,780 psi. | 465,120 psi |
| 486/9181/PEP450. | 20 sec. | 265 F. | 20,506 psi | 361.244 psi |

The invention claimed is:

1. An oligomeric polyol composition comprising at least one oligomeric polyol component, at least one monomeric polyol, and at least one polyhydroxylated aromatic compound;
   wherein the at least one oligomeric polyol component comprises residues of either or both of the at least one monomeric polyol and the at least one polyhydroxylated aromatic compound linked by one or more carbonate groups and optionally one or more oxygen ether groups; and
   wherein the at least one monomeric polyol comprises more than three hydroxyl groups and comprises one or more oxygen ether groups.

2. The composition of claim 1, wherein the at least one monomeric polyol has more than three secondary hydroxyl groups.

3. The composition of claim 1, wherein at least a portion of the residues of the polyhydroxylated aromatic compound comprises residues of at least one bisphenol.

4. The composition of claim 1, wherein at least a portion of the oligomeric polyol component residues are linked by carbonate groups.

5. The composition of claim 1, wherein the at least one monomeric polyol comprises both one or more oxygen ether groups and one or more or linking nitrogen atoms comprised within an alkylene chain.

6. The composition of claim 1, wherein at least a portion of the at least one polyhydroxylated aromatic compound comprises bisphenol A.

7. The composition of claim 1, wherein the at least one monomeric polyol is tetrafunctional having four hydroxyl groups.

8. The composition of claim 7, wherein the at least one monomeric polyol comprises four or more secondary hydroxyl groups.

9. The composition of claim 8, wherein the at least one polyhydroxylated aromatic compound is present in an amount of from about 15 weight percent to about 37 weight percent based on the total weight of the oligomeric polyol composition.

10. The composition of claim 1, wherein at least one oligomeric polyol component comprises four or more secondary hydroxyl groups.

11. The composition of claim 10, wherein at least one oligomeric polyol component comprises six or more secondary hydroxyl groups.

12. The composition of claim 1, wherein at least one the oligomeric polyol component comprises an oligomeric network comprising residues of the at least one polyhydroxylated aromatic compound and residues of the at least one monomeric polyol; and a plurality of peripheral groups each comprising one or more hydroxyl groups bound to the oligomeric network by a plurality of linking units, wherein at least a portion of the linking units are oxygen atoms of carbonate linkages and optionally hydrocarbyl ether linkages.

13. The composition of claim 12, wherein at least a portion of the linking units are carbonate linkages.

14. The composition of claim 1, wherein the at least one oligomeric polyol component comprises carbonate species comprising one or more carbonate groups and two or more residues of the monomeric polyol.

15. The composition of claim 1, wherein the at least one monomeric polyol comprises a mixture of polyols having an average molecular weight of less than 500 grams per mole.

16. The composition of claim 15, wherein the at least one monomeric polyol comprises a propoxylated polyether polyol.

17. A method of making the oligomeric polyol composition of claim 1, comprising contacting one or more compositions containing one or more polyhydroxylated aromatic moieties with one or more monomeric polyols having more than three hydroxyl groups in the presence of at least one activating agent and an effective amount of at least one of a catalyst, a promoter or a mixture thereof, at a temperature sufficient to cause formation of the oligomeric polyol component to provide the product oligomeric polyol composition.

18. The method of claim 17, wherein the one or more polyhydroxylated aromatic moieties are present in an amount such that the molar ratio of polyhydroxylated aromatic compound to the at least one monomeric polyol is about 0.25 to 1 or greater.

19. The method of claim 17, wherein the one or more polyhydroxylated aromatic moieties are derived from one or more polycarbonates.

20. The composition of claim 1, prepared by a method comprising contacting one or more compositions containing one or more polyhydroxylated aromatic moieties with one or more monomeric polyols having more than three hydroxyl groups in the presence of at least one activating agent and an effective amount of at least one of a catalyst, a promoter or a mixture thereof, at a temperature sufficient to cause formation of the oligomeric polyol component to provide the product oligomeric polyol composition.

21. The composition of claim 20, wherein the one or more polyhydroxylated aromatic moieties are derived from one or more polycarbonates.

22. A polyurethane composition prepared from a composition comprising at least one oligomeric polyol component, at least one monomeric polyol, and at least one polyhydroxylated aromatic compound;
wherein the at least one oligomeric polyol component comprises residues of either or both of the at least one monomeric polyol and the at least one polyhydroxylated aromatic compound linked by one or more carbonate groups and optionally one or more oxygen ether groups; and
wherein the at least one monomeric polyol comprises more than three hydroxyl groups, wherein urethane units are formed from reaction of isocyanate moieties of one or more polyisocyanates and at least a portion of the hydroxyl groups of the at least one oligomeric polyol component and at least a portion of the hydroxy groups of the at least one monomeric polyol.

23. An article comprising the composition according to claim 22, which exhibits a heat distortion temperature in excess of 110 degrees centigrade, a flexural strength in excess of 10,000 psi and a flexural modulus in excess of 400,000 psi.

24. A method comprising: contacting the composition of claim 1 with one or more polyisocyanate moieties, optionally in the presence of a catalyst, at a temperature sufficient to cause at least a portion of the hydroxyl groups of the at least one oligomeric polyol component and at least a portion of the hydroxy groups of the at least one monomeric polyol to react with one or more isocyanate groups or latent isocyanate groups of the polyisocyanate moieties to form a polyurethane product.

25. A method comprising:
(a) mixing a first reactant comprising one or more polyisocyanates or latent polyisocyanates with a second reactant comprising the oligomeric polyol composition according to claim 1 to form a reactive mixture;
(b) transferring the reactive mixture into a mold; and
(c) curing the reactive mixture within the mold to afford a molded part;
wherein during step (c) at least a portion of the hydroxyl groups of the at least one oligomeric polyol component and at least a portion of the hydroxy groups of the at least one monomeric polyol reacts with one or more isocyanate groups or latent isocyanate groups to form a polyurethane product.

26. A composition comprising:
(a) first part comprising a polyisocyanate; and
(b) a second part comprising an oligomeric polyol composition according to claim 1; wherein when the first part and the second part are contacted the composition cures by reaction of at least a portion of the hydroxyl groups of the at least one oligomeric polyol component and at least a portion of the hydroxy groups of the at least one monomeric polyol with the polyisocyanate.

27. The composition of claim 1 wherein the at least one monomeric polyol is a polyether polyol.

* * * * *